(12) United States Patent
Chakraborty et al.

(10) Patent No.: US 10,121,076 B2
(45) Date of Patent: Nov. 6, 2018

(54) RECOGNIZING ENTITY INTERACTIONS IN VISUAL MEDIA

(71) Applicant: SRI International, Menlo Park, CA (US)

(72) Inventors: Ishani Chakraborty, Franklin Park, NJ (US); Hui Cheng, Bridgewater, NJ (US); Omar Javed, Franklin Park, NJ (US)

(73) Assignee: SRI International, Menlo Park, CA (US)

( * ) Notice: Subject to any disclaimer, the term of this patent is extended or adjusted under 35 U.S.C. 154(b) by 186 days.

(21) Appl. No.: 15/144,279

(22) Filed: May 2, 2016

(65) Prior Publication Data

US 2016/0247023 A1 Aug. 25, 2016

Related U.S. Application Data

(63) Continuation of application No. 14/021,696, filed on Sep. 9, 2013, now Pat. No. 9,330,296, which is a continuation-in-part of application No. 13/967,521, filed on Aug. 15, 2013, now Pat. No. 9,268,994.

(60) Provisional application No. 61/787,375, filed on Mar. 15, 2013.

(51) Int. Cl.
*G06K 9/00* (2006.01)

(52) U.S. Cl.
CPC ..... *G06K 9/00677* (2013.01); *G06K 9/00221* (2013.01); *G06K 9/00664* (2013.01)

(58) Field of Classification Search
CPC ........... G06K 9/00248; G06K 9/00221; G06K 9/00677
See application file for complete search history.

(56) References Cited

U.S. PATENT DOCUMENTS

| | | | |
|---|---|---|---|
| 8,064,688 B2 * | 11/2011 | Schneiderman | G06K 9/00241 382/159 |
| 9,230,258 B2 * | 1/2016 | Adair | G06Q 30/02 |
| 2008/0298643 A1 * | 12/2008 | Lawther | G06F 17/30256 382/118 |
| 2009/0322904 A1 * | 12/2009 | Takahashi | G11B 27/034 348/231.3 |
| 2012/0314935 A1 | 12/2012 | Cheng et al. | |
| 2013/0215116 A1 * | 8/2013 | Siddique | G06Q 30/0643 345/420 |

OTHER PUBLICATIONS

Edward T. Hall, A System for the Notation of Proxemic Behavior, American Anthropologist, New Series, vol. 65, No. 5, Selected Papers in Method and Technique (Octa., 1963), pp. 1003-1026.
(Continued)

*Primary Examiner* — Shefali Goradia
(74) *Attorney, Agent, or Firm* — Moser Taboada

(57) ABSTRACT

An entity interaction recognition system algorithmically recognizes a variety of different types of entity interactions that may be captured in two-dimensional images. In some embodiments, the system estimates the three-dimensional spatial configuration or arrangement of entities depicted in the image. In some embodiments, the system applies a proxemics-based analysis to determine an interaction type. In some embodiments, the system infers, from a characteristic of an entity detected in an image, an area or entity of interest in the image.

21 Claims, 9 Drawing Sheets

(56) References Cited

OTHER PUBLICATIONS

Xiangxin Zhu, et al., Face Detection, Pose Estimation, and Landmark Localization in the Wild, Dept. of Computer Science, University of California, Irvine, 2012.
Proxemics, Wikipedia, accessed Dec. 18, 2013.
Yi Yang, et al., Recognizing Proxemics in Personal Photos, UC Irvine, 2012.
U.S. Provisional Patent Application Serial No. 61n87,375, filed Mar. 15, 2013.
Szeliski, Computer Vision: Algorithms and Applications (Springer Verlag London Limited, 2011), p. 577.
Stuart Houghton, Google Glass: release date, news and features, Updated, Are Google's glasses more than just a gimmick?, http://www. tech radar .com/us/news/video/google-glass-what-you-need-to-know-1 078114.
Yao et al., "Recognizing Human-Object Interactions in Still Images by Modeling the Mutual Context of Objects and Human Poses", IEEE, Sep. 2012, pp. 1691-1703.

* cited by examiner

RECOGNIZING ENTITY INTERACTIONS IN VISUAL MEDIA

CROSS-REFERENCES TO RELATED APPLICATIONS

This application is a continuation of and claims priority to and the benefit of U.S. patent application Ser. No. 14/021,696, filed Sep. 9, 2013, which is a continuation-in-part of and claims priority to U.S. Utility patent application Ser. No. 13/967,521, filed Aug. 15, 2013, and claims priority to and the benefit of U.S. Provisional Patent Application Ser. No. 61/787,375, filed Mar. 15, 2013, which are incorporated herein by this reference in their entirety.

BACKGROUND

User-generated digital content has proliferated on the Internet and otherwise, with the integration of digital camera and video recording technology into more and more consumer-oriented electronic devices. These developments have outpaced advancements in technology for the organization, search and retrieval of images and videos. In many instances, images and videos still need to be manually classified and tagged.

In computer vision, mathematical techniques are used to detect the presence of and recognize various elements of the visual scenes that are depicted in digital images. Localized portions of an image, known as features, may be used to analyze and classify an image. Low-level features, such as interest points and edges, may be computed from an image and used to detect entities that are depicted in the image.

BRIEF DESCRIPTION OF THE DRAWINGS

This disclosure is illustrated by way of example and not by way of limitation in the accompanying figures. The figures may, alone or in combination, illustrate one or more embodiments of the disclosure. Elements illustrated in the figures are not necessarily drawn to scale. Reference labels may be repeated among the figures to indicate corresponding or analogous elements.

DETAILED DESCRIPTION OF THE DRAWINGS

Figure 1:
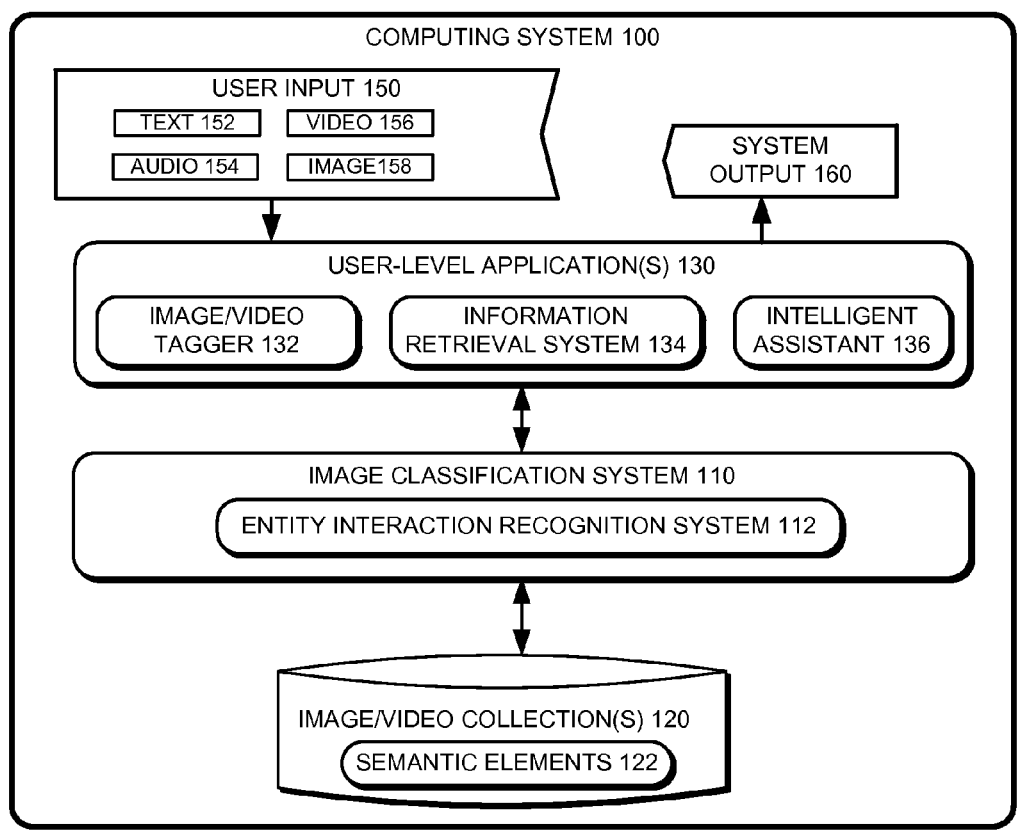
FIG. 1 is a simplified module diagram of at least one embodiment of a computing system including an image classification system that is accessible by a number of user-level applications, where the image classification system interfaces with one or more image and/or video collections and the image classification system includes an entity interaction recognition system.

While the concepts of the present disclosure are susceptible to various modifications and alternative forms, specific embodiments thereof are shown by way of example in the drawings and are described in detail below. It should be understood that there is no intent to limit the concepts of the present disclosure to the particular forms disclosed. On the contrary, the intent is to cover all modifications, equivalents, and alternatives consistent with the present disclosure and the appended claims.

Many digital images contain scenes that involve entity interactions. Such images may depict entities involved in various activities. For example, such images may depict people interacting with other people and/or people interacting with one or more objects (e.g., to perform a task, play a sport, etc.). For ease of discussion, the various types of captured or recorded images, including still photographs, video, film, TV, and other depictions of "real-world" scenes and events embodied in an electronic (e.g., digital) form may be referred to herein simply as "images," or individually as an "image." More generally, the term "image" may be used herein to refer to an instance of a visible electronic or otherwise machine-readable representation or reproduction of an observed physical reality, which is produced by a sensing device, such as an optical and/or electronic device (e.g., an image sensor, scanner, or camera), or by a combination of such devices, using any suitable capturing or recording technique (e.g., picture taking, streaming of digital content to a server, etc. For ease of discussion, the term "captured" may be used herein to refer generally to any such capturing or recording techniques. An "observed physical reality" or "real-world" observation may involve, for example, an event, scene, or activity, a person, an object, a surface, or a number or combination of any of these, any of which may be referred to herein as an "entity."

Some automated techniques can detect specific instances of previously-detected entities (e.g., "person," "ball," "grass," etc.) in images. Not long ago, however, one researcher stated that, "[o]ut of all the visual tasks we might ask a computer to perform, analyzing a scene and recognizing all of the constituent objects remains the most challenging . . . . There is not even any consensus among researchers on when this level of performance might be achieved." Szeliski, Computer Vision: Algorithms and Applications (Springer Verlag London Limited, 2011), p. 577. Occlusion, as well as pose, shape, and appearance variations and other factors, make recognition a difficult problem. Further, according to the same researcher, "generic category (class) recognition is still a largely unsolved problem." Id. at 611. Accordingly, detecting and classifying the higher-level interactions between or among discrete entities (such as people and objects) depicted in images poses a significant challenge.

As disclosed herein, some embodiments of an image classification system 110 can, among other things, apply computer-implemented algorithms to effectively determine a three-dimensional (3D) layout of people, objects, and other entities depicted in an image, and draw inferences from the algorithmically-determined 3D layout using, for example, automated reasoning techniques and/or other artificial intelligence-based methods. Some embodiments of the image classification system 110 can accommodate images that depict a wide range of people sizes (e.g., big adults vs. small children), a large variety of people heights (e.g., tall vs. short), and/or a number of diverse people poses (such as sitting, standing, and standing on platforms). Moreover, images captured or recorded by wearable cameras and other mobile devices may depict human interactions that involve the user of the device as well as interactions that do not involve the user. For example, some images captured by wearable devices may depict human interactions that involve other individuals but which are simply observed by the user of the wearable device (i.e., without the user as a participant in the interaction). Embodiments of the image classification system 110 can accommodate the wide variety of different types of interactions and interaction environments that are captured by these and other devices.

Referring now to FIG. 1, an embodiment of an entity interaction recognition system 112 is embodied in a computing system 100. As described in more detail below, the illustrative entity interaction recognition system 112 algorithmically detects and classifies entity interactions, including human interactions with other people, human interactions with objects or other entities, and other entity-object interactions, which are depicted in images and videos, in an automated fashion; that is, without requiring manual tagging or other similar human effort. In some embodiments, detected entities (such as human faces, surfaces, or known objects) are analyzed and used by the entity interaction recognition system 112 to draw broader inferences about the image (e.g., to infer a type of body pose of a person depicted in the image, an area or entity of interest that is depicted in the image, and/or or a type of interaction depicted in the image). In some embodiments, a proxemics-based analysis is applied to assist with these and/or other inferences.

In some embodiments, the entity interaction recognition system 112 infers a spatial configuration and/or three-dimensional arrangement of one or more entities depicted in the image. In some embodiments, the entity interaction recognition system 112 infers an area of interest in the image, e.g., from the inferred spatial configuration or three-dimensional arrangement or from one or more features of the two-dimensional image. In some embodiments, the entity interaction recognition system 112 analyzes an inferred area of interest to detect additional entities of interest, which may then be used to further distinguish an entity, area of interest, or interaction depicted in the image from other known entities, areas of interest, and interactions. The entity interaction recognition system 112 may classify the image as depicting a certain type of interaction, based on one or more of such inferences. In some embodiments, proxemics-based attributes are used to classify the detected interaction.

Illustratively, the entity interaction recognition system 112 is embodied as a component of the image classification system 110. The image classification system 110 may include or interface with other image processing components that are not shown in the figures, such as a face detection system, a face recognition system, an object recognition system, and/or others. The illustrative image classification system 110 (and thus the entity interaction recognition system 112) is communicatively coupled to one or more image/video collections 120 and one or more user-level applications 130, which are embodied in the computing system 100. Each of the image classification system 110, the entity interaction recognition system 112, the image/video collections 120, the user-level applications 130, and their various components may be embodied as a number of computerized modules and/or data structures, in computer software, firmware, and/or hardware components of the computing system 100. The computing system 100 may include one or multiple computing devices (e.g., communicating over a network). Any or all of the image classification system 110, the entity interaction recognition system 112, the image/video collections 120, and the user-level applications 130 may be embodied on the same or different computing devices in the computing system 100, and may be communicatively coupled by one or more networks, as described more fully below with reference to FIG. 9.

In some embodiments, the entity interaction recognition system 112 may be embodied as a separate component with which the image classification system 110 interfaces (e.g., in a cloud computing environment), rather than as a component of the image classification system 110. Further, the entity interaction recognition system 112 may interface directly with user-level applications 130 and/or image/video collection(s) 120, rather than as a component of the image classification system 110, in some embodiments.

The image classification system 110 interfaces with the image/video collections 120 and with the user-level applications 130. For example, the image classification system 110 may, among other things, supply image-specific human interaction classifications and/or other information generated by the entity interaction recognition system 112 to the image/video collections 120 and/or any of the user-level applications 130.

Illustratively, the image/video collection(s) 120 refers generally to one or more bodies of retrievable image, video, or multimedia digital content that may be stored at the computing system 100 and/or other computing systems or devices (e.g., "in the cloud"). The image/video collection(s) 120 may include images that are stored remotely at Internet sites such as PINTEREST and YOUTUBE and/or images that are stored in one or more local collections, such as storage media of a personal computer or mobile device (e.g., a "camera roll" of a mobile device camera application). In any case, images in the image/video collection(s) 120 need not have been previously tagged with meta data or other identifying material in order to be classified by the image classification system 110. More generally, the image classification system 110 can operate on images whether or not they have been previously tagged or annotated in any way.

The image/video collection(s) 120 include semantic elements 122, which are associated with the individual images in the collection(s) 120, e.g., for the purpose of indexing, classifying, or organizing the images. The semantic elements 122 are embodied in an electronic form as, for example, meta data, keywords, tags, or other human-intelligible (e.g., natural language) pieces of information. The semantic elements 122 may be, for example, appended to an image file or linked with an image file using a suitable computer programming referencing mechanism (e.g., indexes, pointers, etc.). The semantic elements 122 may be supplied by the entity interaction recognition system 112 in accordance with a classification of an image. Thus, portions of the image/video data collection(s) 120 may be searchable, e.g. by natural language, keyword searches or structured queries. Other portions of the image/video data collections 120 may be "pre-searchable" in the sense that the images contained therein have not yet been indexed (e.g., according to classifications generated by the image classification system 110). In other words, portions of the image/video data collections 120 may include images that have been at least partially processed by the image classification system 110 and images that have not yet been processed by the image classification system 110. Further, in some embodiments, the semantic elements 122 may reside in the image/video collection(s) 120, with the associated image content residing in other storage locations. The image/video data collection(s) 120 may be embodied as one or more databases, tables, lists, trees, files, and/or other suitable computer data structures, according to the requirements of a particular design or implementation of the computing system 100.

Illustratively, the user-level applications 130 include an image/video tagger module 132, an information retrieval system 134, and an intelligent assistant 136. The image/video tagger module 132 interfaces with the image classification system 110 to electronically annotate or "tag" images with entity interaction classification information (e.g., interaction type) obtained from the entity interaction recognition system 112. In general, the "tags" contain semantically meaningful descriptive information about the images, and may include semantic elements 122. For example, the tags may include human-intelligible labels that identify interaction types depicted in the images, or types of scenes, events, activities, people, objects, or other entities depicted in the images. The tags produced by the image/video tagger module 132 may take the form of words, images, or other identifying marks, and may be stored in computer memory with the tagged image or in an index, for example.

The illustrative image/video tagger module 132 performs such tagging automatically, e.g., without the need for manual review of the images by a human. The image/video tagger module 132 can, among other things, facilitate image search and retrieval using higher-level/conceptual search terms or natural language, including familiar phrases that describe, e.g., human interactions, such as, "the kids visiting grandma," "the girls out on the town," "us walking down the aisle" or "me cutting the birthday cake." The image/video tagger module 132 may be particularly useful in contexts in which the desired high-level classifications are difficult to represent using lower-level features.

In operation, the image/video tagger module 132 receives user input 150, which may include, for example, text 152, audio 154, video 156, and/or image 158. Text input 152 or audio input 154 (e.g., spoken dialog) may include a command or instruction that tells the image/video tagger module 132 to perform tagging as described above on a particular video 156 or image 158 that is specified by the command In some embodiments, a user may simply submit or identify (e.g. by touchscreen input or mouse click) video input 156 or image input 158 to the image/video tagger 132, to initiate the above-described tagging of the video 156 or image 158. Further, in some embodiments, the image/video tagger 132 may operate autonomously or semi-autonomously (e.g., as a background process) to continuously or periodically interface with the image/video collection(s) 120 in order to tag untagged content or update the tags of previously-tagged content. In any case, the image/video tagger 132 may present system output 160, which may simply include a message to the user of the computing system 100 that the tagging process has successfully completed, or a request for the user to verify the automatically-produced tags. For example, the output 160 may be presented to the user via the user's wearable or otherwise portable device (e.g., on a relatively unobtrusive display as exemplified by GOOGLE GLASS), or via other communicatively coupled electronic devices. The output 160 may be presented as audio (e.g., to a paired headset, earphone, or smartphone, using automated text-to-speech methods to create the audio), or by visual presentation to a display screen of a smartphone, tablet, or other computing device. In some embodiments, the output 160 may include graphical or textual elements that are inserted into or overlay at least a portion of the viewing area of a user's viewing device (as in an augmented reality system).

The illustrative information retrieval system 134 provides a search portal or other computerized image searching mechanism by which search queries that contain high-level expressions or descriptions of entity interactions, such as those mentioned above, are converted into a set of semantic elements that can be used to retrieve query results that are responsive to the search input, in an automated fashion. Such elements may include, for example, semantic descriptions of events, actions, entities, entity relationships, regions of interest, and/or others (e.g., the semantic elements 122). To do this, the information retrieval system 134 may interface with the image classification system 110 (e.g., the interactions knowledge base 200, FIG. 2) to map the search input to its constituent elements and construct therefrom a corresponding search query. The information retrieval system 134 then executes the search, e.g., on one or more indexed portions of the image/video collection(s) 120, to retrieve the search results. To do this, the information retrieval system 134 may utilize any suitable information retrieval algorithms, such as those that use term frequency-inverse document frequency (td-idf) vectors or inverted indices.

In operation, the information retrieval system 134 receives user input 150, which may include any of the forms of input discussed above and/or others (e.g. text 152, audio 154, video 156, image 158). In some embodiments, the user input 150 includes imagery captured "live" by a wearable computing device, another type of mobile device, or other computing device. The information retrieval system 134 processes the user input 150 as a search request and performs information retrieval as described above. The information retrieval system 134 presents system output 160 in the form of, e.g., search results or a summary thereof. In general, the output 160 may be presented using any suitable means, including visual, audio, and/or tactile outputs. For example, the output 160 may be presented to the user via the user's wearable or otherwise portable device (e.g., on a relatively unobtrusive display as exemplified by GOOGLE GLASS), or via other communicatively coupled electronic devices. The output 160 may be presented as audio (e.g., to a paired headset, earphone, or smartphone, using automated text-to-speech methods to create the audio), or by visual presentation to a display screen of a smartphone, tablet, or other computing device. In some embodiments, the output 160 may include graphical or textual elements that are inserted into or overlay at least a portion of the viewing area of a user's viewing device (as in an augmented reality system).

The illustrative intelligent assistant 136 generally operates in "real time" computing environments, in which "mobile" electronic devices such as smart phones, tablets, wearable computing devices, and/or others, can capture and record entity interactions as they are unfolding. Some wearable devices with cameras (like GOOGLE GLASS, for example) can record such events from an interesting vantage point: the eye- or head-level of the person wearing the device. The intelligent assistant 136 interfaces with the entity interaction recognition system 112 to algorithmically detect and classify such recorded events and provide intelligent assistance to the device user or to another person, and does so as the captured events are occurring and/or at a later time. To do this, the intelligent assistant 136 may access a knowledge base (not shown) of, e.g., rules or templates, which determine how the intelligent assistant 136 should respond to particular detected events, and intelligently (using, e.g., automated reasoning or other artificial intelligence-based techniques) apply the rules or templates to the received images to derive intelligent assistance therefrom. Such intelligent assistance may include, for example, context-relevant suggestions, alerts, notifications, and/or advice.

In operation, the intelligent assistant 136 may receive user input 150 in the form of "live" (e.g., streaming) video 156 and processes the video images (e.g. keyframes) as described above. The intelligent assistance (e.g., suggestions, notifications, etc.) prepared by the intelligent assistant 136 based on the classifications generated by the entity interaction recognition system 112 are presented to the user as system output 160. Such output 160 may be presented in any suitable (e.g. context-relevant) form, as mentioned above. For example, the output 160 may be presented to the user via the user's wearable or otherwise portable device (e.g., on a relatively unobtrusive display as exemplified by GOOGLE GLASS), or via other communicatively coupled electronic devices. The output 160 may be presented as audio (e.g., to a paired headset, earphone, or smartphone, using automated text-to-speech methods to create the audio), or by visual presentation to a display screen of a smartphone, tablet, or other computing device. In some embodiments, the output 160 may include graphical or textual elements that are inserted into or overlay at least a portion of the viewing area of a user's viewing device (as in an augmented reality system).

In general, the user inputs 150 are received by the computing system 100 by the requisite user interface mechanism, e.g., microphone, touchscreen, keypad, camera, etc. Likewise, the system outputs 160 are presented to the user by any suitable output mechanism, e.g., speaker, display screen, etc. Further, it should be appreciated that while not specifically shown, any of the user-level applications 130 may simply store the user inputs 150 and/or system outputs 160 in computer memory (e.g., for later use or review) and/or transmit the user inputs 150 and/or outputs 160 to another computing system or to another user-level software application, for use thereby (e.g., over a network).

Figure 2:
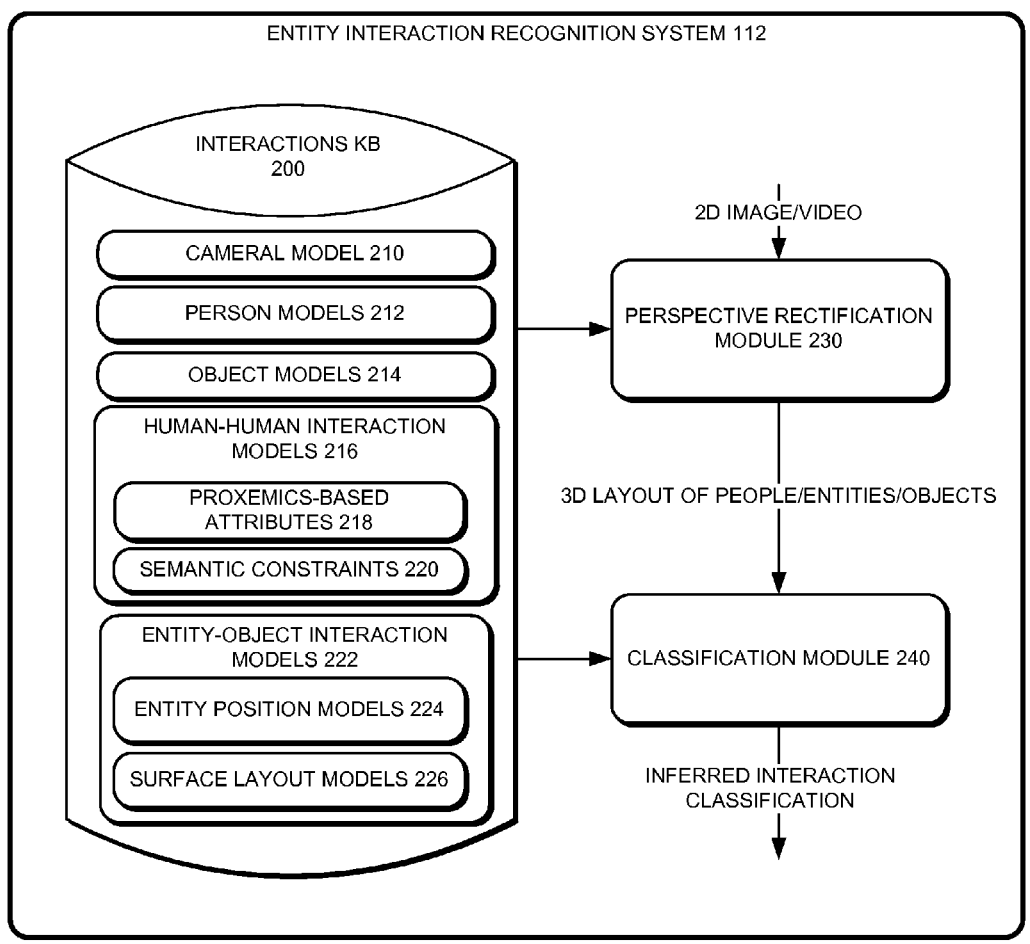
FIG. 2 is a simplified module diagram of at least one embodiment of the entity interaction recognition system of FIG. 1, including a perspective rectification module and a classification module.

Referring now to FIG. 2, the entity interaction recognition system 112 is shown in greater detail. An embodiment of the entity interaction recognition system 112 includes a computerized framework that integrates visual proxemics with estimated three-dimensional spatial configurations or arrangements of people to identify typical human interactions depicted in images. The illustrative entity interaction recognition system 112 is embodied as an interactions knowledge base 200, a perspective rectification module 230, and a classification module 240. The perspective rectification module 230 and the classification module 240 interface with the interactions knowledge base 200 to apply various computerized models 210, 212, 214, 216, 218, 220, 222, 224, 226 to the analysis and classification of two-dimensional images that depict three-dimensional scenes, as described herein.

The interactions knowledge base 200 provides data representations of knowledge in a variety of areas that are relevant to the analysis of entity interactions in images. The illustrative models 210, 212, 214, 216, 218, 220, 222, 224, 226 of the interactions knowledge base 200 contain data that indicate relationships between information that can be extracted from images (e.g., low-level features, etc.) and a likely semantic meaning of such extracted information. For example, any of the models 210, 212, 214, 216, 218, 220, 222, 224, 226 provides rules, mappings, probability distributions, statistical likelihoods, or other relationship indicators that allow the entity interaction recognition system 112 to interpret information that is extracted from an image. In some cases, the relationship indicators may be developed by applying machine learning techniques to large sets of data (e.g., "training" datasets). In other cases, the relationship indicators and/or other data in the knowledge base 200 may be obtained or derived from, e.g., empirical studies or other research. While shown as components of a singular interactions knowledge base 200 for simplicity, it should be understood that any of the models 210, 212, 214, 216, 218, 220, 222, 224, 226 may reside in other knowledge bases or other computing systems communicatively coupled to the computing system 100, in some embodiments.

Portions of the data in the interactions knowledge base 200 may be structured (e.g., having a defined format, or computer-readable data) and other portions may be unstructured (e.g., natural language or free-form text). Portions of the interactions knowledge base 200 may be embodied as one or more computer-accessible data and/or programming structures (e.g., vectors, matrices, databases, lookup tables, or the like), and may include one or more indexed or otherwise searchable stores of information. The interactions knowledge base 200 may contain or reference data, arguments, parameters, and/or machine-executable algorithms that can be applied to the analysis and classification of images as described herein.

The camera model 210 provides a computer-accessible representation of knowledge and assumptions about camera parameters (e.g., the parameters of the camera or other device used to record the two-dimensional image being analyzed, where "camera" is used herein to refer to any such device) as they relate to entities detected in an image or to the image as a whole. Such parameters include, for instance, the camera height relative to the ground plane and the focal length. The illustrative camera model 210 is embodied as a linearized camera model that is based on a hypothesis that all faces in a two-dimensional image are (a) located on the same plane (e.g., the ground plane) and (b) of the same size or height, which is constant. In some embodiments, a typical pinhole camera model with uniform aspect ratio, zero skew and restricted camera rotation is used. In some embodiments, the camera model 210 sets the coordinates of the camera center as x=0, z=0, where x refers to a position along a horizontal axis (e.g., along the length of the two-dimensional image), and z refers to a position along an axis that projects out of the two dimensional image (e.g., indicating three-dimensional depth). In some embodiments, the camera model 210 assumes that the camera is tilted slightly along the x axis by an angle, theta. As explained further below, these assumptions do not always hold true, and thus, the entity interaction recognition system 112 may use an instance of the camera model 210 as a "starting point" from which it derives a three-dimensional estimation of faces and other entities depicted in the two-dimensional image.

The person models 212 provide computer-accessible representations of knowledge and assumptions about the typical characteristics of people, such as characteristics of human faces and people heights as they relate to people detected in an image or to the image as a whole. The illustrative person models 212 are embodied as databases that contain estimates of typical sizes (e.g., height and width measurements) of human faces and other human attributes (e.g., hands, feet, shoulder widths, arm/leg length, torso size, etc.), as well as people heights (e.g. how tall they are, typically) relative to the ground plane, when people are depicted at various focal lengths. The person models 212 also indicate relationships between such measurements and dimensions as compared to the likely age of the person depicted (e.g., child or adult), in view of the camera focal length.

The object models 214 provide computer-accessible representations of knowledge and assumptions about the typical characteristics or features of known entities other than people (such as various objects) that may be detected in an image, and corresponding semantic information that describes such entities. The object models 214 may relate certain low-level features depicted in images to known attributes of various objects (e.g., an area with a circular boundary may indicate a ball, or an area with eyes and an irregular boundary may indicate an animal). For example, some existing object detection systems can detect the presence of vehicles, buildings, and mountain, in images.

The human-human interaction models 216 provide computer-accessible representations of knowledge and assumptions about the typical characteristics or features of human interactions with other people, which may be detected in an image, and corresponding semantic information. The illustrative human-human interaction models 216 specify constraints in the form of rules, which may be implemented as mathematical equations, that define relationships between particular spatial arrangements of people detected in an image and the likely corresponding three-dimensional interpretation of such arrangements. The human-human interaction models 216 include proxemics-based attributes 218 and semantic constraints 220.

The proxemics-based attributes 218 specify relationships between categories of measurable features that can be detected in images or estimated therefrom, and the corresponding proxemics-based interpretations of such features. The measurable features include, for example, the inter-person distance (e.g., how closely or far apart the people in the image are from one another), the people configuration or "shape" (e.g., how people are arranged or positioned with respect to one another in the image), the camera pose (e.g., from what camera angle or position was the image captured), the shot composition of an image (e.g., how much distance was there between the camera and the people depicted in the image), and the number of layers depicted in an image (e.g., foreground and background). Such measurements may be relative or absolute, and may determine by, for example, counting the number of pixels or megapixels in the image or a portion thereof. The proxemics-based attributes 218 may also be referred to as visual proxemes, in some embodiments.

Proxemics refers to a branch of cultural anthropology that studies the use of space by people and its implications for human interactions, including nonverbal communication. Among other things, proxemics associates inter-person distance with the relationships between and among people. The proxemics-based attributes 218 categorize inter-person distances that may be detected and measured in images (e.g., by counting a number of pixels or megapixels) into a number of different classes, such as: "intimate distance" (e.g., for close family), "personal distance" (e.g., for friends), "social" distance (e.g., for acquaintances) and "public distance" (e.g., for strangers).

Certain types of human interactions result in distinct spatial or shape configurations in three-dimensional space. For example, to enable direct eye contact between any pair of participants in a group interaction, such as a family dinner, people may align themselves in a semi-circular shape. On the other hand, if two people are the focus of attention, as in a wedding photo, the image may have multiple shape layers, where the two people at the center of attention share an intimate space, while the audience forms a distinct second layer in the background. The proxemics-based attributes 218 specify a number of different people shape configurations that may be detected in images, such as linear, convex, and concave shapes (e.g., patterns derived from the directions in which the people's faces depicted in the image are oriented). For example, all faces oriented in the same direction may indicate a linear configuration, while faces oriented in different directions may indicate a convex or concave configuration.

The proxemics-based attributes 218 also specify a number of different camera-related parameters, such as different types of shot composition and different types of camera poses or viewpoints that may be used in the capturing of an image. The illustrative proxemics-based attributes 218 specify criteria for algorithmically determining whether an image is likely a long shot, a medium shot or a close-up, and indicate the relationships between the different types of shot composition and the different proxemics-based categories. For example, long shots may be associated with "public proxemics," medium shots with "personal proxemics," and close-up shots with "intimate proxemics."

Similarly, the illustrative proxemics-based attributes 218 specify criteria for algorithmically determining whether the camera viewpoint used in capturing the image is likely a low-angle, eye-level, or high-angle camera pose. Such criteria may include the degree of occlusion in the scene depicted by the image being analyzed. For example, if every person depicted in the scene is fully visible, a high-angle shot may be likely. The proxemics-based attributes 218 also indicate the relationships between the different types of camera viewpoints and the different proxemics-based categories. For example, close-up or eye-level shots may be associated with intimate scenes, whereas high-angle shots may be associated with social or public scenes. Low-angle shots may be suitable for the capture of people in the foreground without concerns of occluding the background, and as such may be associated with, e.g., posed or group photos.

In some embodiments, the entity interaction recognition system 112 applies the proxemics-based attributes 218 to describe the human interactions depicted in the images that are analyzed. For example, if the entity interaction recognition system 112 determines, using the proxemics-based attributes 218, that the people depicted in an image are arranged within a social distance in a single layer with a concave shape, and determines that the image was likely captured using a high-angle, medium shot, the entity interaction recognition system 112 may infer that the image depicts a group interaction. In contrast, if the entity interaction recognition system 112 determines, using the proxemics-based attributes 218, that the people depicted in an image are arranged within an intimate distance and the image was likely captured using an eye-level, close-up camera pose, the entity interaction recognition system 112 may conclude that the image depicts a family photo. The proxemics-based attributes 218 are used to construct the proxemics-based features 412 (FIG. 4) that are used by the classification module 240 to determine a likely interaction type to associate with an image, as described in more detail below with reference to FIG. 4.

The semantic descriptions that are associated with the proxemics-based attributes may be referred to herein as visual proxemes or proxemics classes. As used herein, such terminology may refer to, among other things, a set of prototypical patterns that can be used to characterize human interactions, including social interactions. Some examples of visual proxemes/proxemics classes include: "group interaction," "family photo," "group photo," "couple with an audience," "crowd scene," and "speaker with audience." With regard to these and other proxemics classes, the people configurations in the three-dimensional space would better reflect the type of interaction than the corresponding configurations in the 2D image space. For example, images depicting group interactions, family photos, crowd scenes, and a speaker with an audience all have many faces distributed throughout the image space, but they have very different spatial arrangements that can be distinguished in the 3D space but not the two dimensional (2D) image space.

The semantic constraints 220 specify criteria for algorithmically evaluating particular combinations of features or attributes that are detected in an image by the entity interaction recognition system 112 and refining the image classification based on such evaluation. For example, the semantic constraints 220 may specify rules (which may be implemented as mathematical equations) for handling images or detected portions thereof that do not comply with the assumptions of the camera model 210. In some embodiments, the semantics of visual proxemics are used by the entity interaction recognition system 112 to constrain the possible three-dimensional (e.g., depth) orderings of outliers, where the outliers are identified by the outlier detection and reasoning module 318 (FIG. 3), described in more detail below. Illustratively, the semantic constraints 220 include two types of constraints—visibility constraints and localized pose constraints. It should be understood, however, that both the proxemics-based attributes 218 and the semantic constraints 220 are described herein with reference to a limited number of illustrative examples, and are not intended to be limited thereby.

The illustrative visibility constraint specifies a rule (which may be implemented as a mathematical equation) for interpreting a detected human face that violates the common ground plane assumption (e.g., that all faces are aligned with the ground plane). Such may occur, for example, if an image depicts one person sitting in front of another person who is standing. To improve the ability of the entity interaction recognition system 112 to appropriately classify such an image, the visibility constraint specifies that if two faces are visible at the same horizontal location in the image, the lower face must be closer (in depth) to the camera that recorded the image than the face above it.

The illustrative localized pose constraint specifies a rule (which may be implemented as a mathematical equation) for interpreting a detected human face that violates the camera model 210's assumption that all detected faces are the same size. This may occur if, for example, an image depicts an adult and a child in close proximity to one another. Analyzing the image in two dimensions, the camera model 210 may conclude that the child is actually an adult who is positioned further away from the camera than the adult, based on the smaller size of the child's face relative to the size of the adult face. To improve the ability of the entity interaction recognition system 112 to appropriately classify such an image, the localized pose constraint assumes that the people who are physically close to each other also share the same pose. Thus, where an image depicts multiple faces that are physically close but there is at least one face that is not of the uniform size, the localized pose constraint adjusts the estimated depths of at least the outlier face(s) by discounting their vertical position in the image.

The entity-object interaction models 222 provide computer-accessible representations of knowledge and assumptions about the typical characteristics or features of entity interactions (e.g., human or non-human entities) with other non-human entities (e.g., surfaces, objects, etc.), which may be detected in an image, and corresponding semantic information. The illustrative entity-object interaction models 222 specify constraints in the form of rules, which may be implemented as mathematical equations, which define relationships between particular spatial configurations or arrangements of people and non-human entities detected in an image and the likely corresponding three-dimensional interpretation of such entity-object arrangements. In some embodiments, the entity-object interaction models 222 specify proxemics-based attributes and/or constraints that apply to people-object interactions. For example, in some embodiments, the entity-object interaction models 222 specify attributes and constraints that are analogous to the proxemics-based attributes 218 and the semantic constraints 220, but which are adapted for entity-object interactions. For example, the visibility constraint may be applied to entity-object interactions in a similar manner as described above.

The illustrative entity-object interaction models 222 include one or more entity position models 224 and one or more surface layout models 226. The illustrative entity position models 224 specify, for example, human face, gaze, and hand positions or spatial configurations and relationships between such positions or spatial configurations and various types of interactions. For instance, the entity position models 224 may indicate that a particular combination of face, gaze, and hand position data likely indicates that a person depicted in an image is manipulating an object. The illustrative surface layout models 226 specify, for example, surface spatial configurations and relationships between such configurations and various types of interactions. For example, the surface layout models 226 may indicate that a particular spatial configuration of a surface (e.g., a flat surface in front of a person) likely indicates that a person is working at a table, or that an object is resting on the surface.

Referring still to FIG. 2, the illustrative perspective rectification module 230 analyzes two-dimensional images and estimates therefrom a three-dimensional arrangement of people and/or entities depicted in the images. To do this, the perspective rectification module 230 detects human faces in the two-dimensional images using, e.g., existing face detection techniques. The perspective rectification module 230 estimates camera parameters, and estimates people/face/entity depths in 3D using an initial linear camera model 210. The perspective rectification module 230, maps people/face/entity locations from the 2D scene space to the 3D space. The perspective rectification module 230 applies the proxemics-based attributes 218 and the semantic constraints 220 to reason about outliers rather than discarding the outliers, and applies the results of such reasoning to improve the camera model 210. In some embodiments, the perspective rectification module 230 computes the camera location and camera pose in order to make the camera model 210 view invariant, or for other reasons.

The classification module 240 categorizes images into common types of human interactions (i.e., proxemes). In some embodiments, the classification module 240 identifies one or more areas or entities of interest in an image based on the determined proxemics class and/or other features, as described in more detail below. To do this, classification module 240 applies a set of spatial and structural features, e.g., the proxemics-based features 412, human features 414, and/or surface/entity features 416 shown in FIG. 4, described below) to detect and recognize a variety of human interactions, including people-people interactions and people-object interactions. In some embodiments, the classification module 240 uses the proxemics-based features 412 (e.g., a set of shape descriptors derived from the attributes of proxemics) to classify the image as depicting a type of people interaction in the eyes of each individual participant. Doing so may allow for more robust classification, and also enables images to be classified according to the specific roles of particular individuals in a visual proxeme (e.g., speaker vs. audience, couple vs. crowd).

Figure 3:
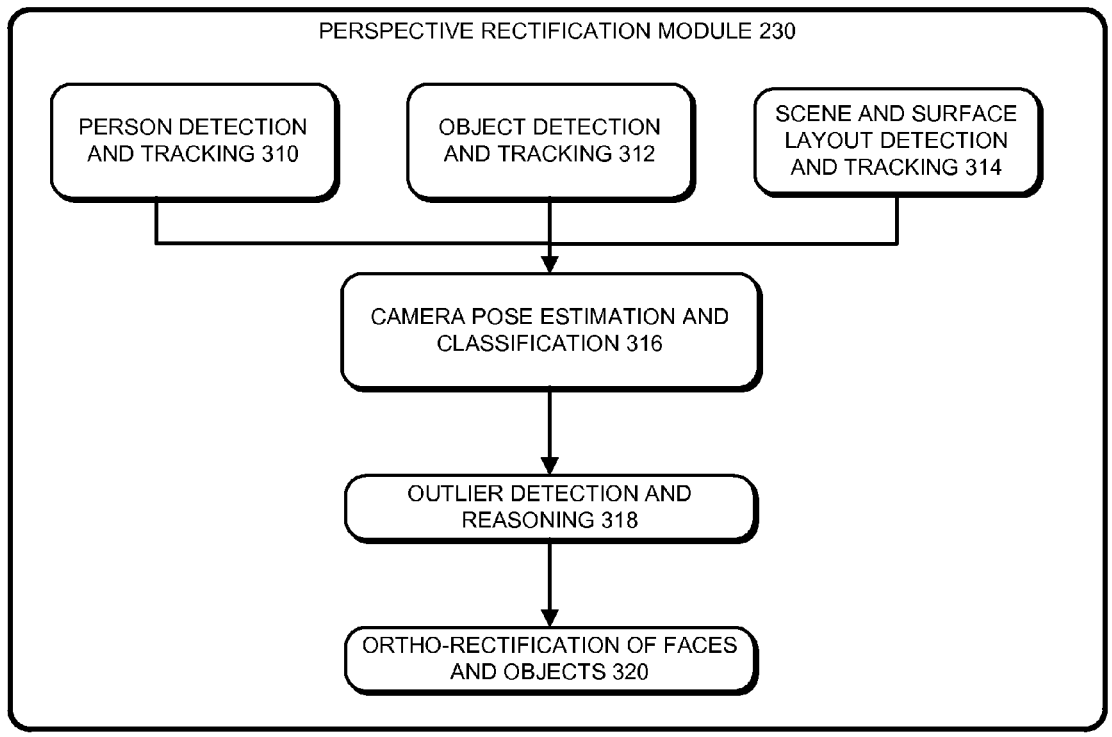
FIG. 3 is a simplified module diagram of at least one embodiment of the perspective rectification module of FIG. 2.

Referring now to FIG. 3, components of the perspective rectification module 230 are shown in more detail. As noted above, the perspective rectification module 230 analyzes a two-dimensional image by algorithmically detecting entities having one or more known attributes (e.g., faces, objects, scenes, surfaces, etc.) that are depicted in the image, in two dimensions. According to some embodiments, the perspective rectification module 230 computes a separate coordinate system for each of the detected entities. Alternatively or in addition, in some embodiments, the perspective rectification module 230 generates a coordinate system for a group of the detected entities. To do this, the perspective rectification module 230 utilizes a person detection and tracking module 310 to detect and localize human people (e.g., faces) depicted in the image, and, where a video or sequence of images is being analyzed, to track the location of the people over the video or image sequence. The perspective rectification module 230 utilizes an object detection and tracking module 312 to detect and localize known objects (e.g., work pieces, vehicles, animals, etc.) depicted in the image, and, where a video or sequence of images is being analyzed, to track the location of the detected objects over the video or image sequence. The perspective rectification module 230 utilizes a scene and surface layout detection and tracking module 314 to detect and localize scenes and surfaces (e.g., landscapes, components of a scene, etc.) depicted in the image, and, where a video or sequence of images is being analyzed, to track the location of the detected scenes and surfaces over the video or image sequence. Existing people, face, object, scene, and surface layout detection techniques may be used. For example, entity detection portions of each or any of the modules 310, 312, 314 may be embodied as a separate component (e.g., a third party product) that interfaces with the perspective rectification module 230. Additionally, the modules 310, 312, 314 may estimate the three-dimensional spatial configuration or position of each of the detected faces/objects/surfaces using the techniques described herein and in greater detail with reference to FIG. 5.

A camera pose estimation and classification module 316 estimates camera pose and/or other camera parameters of the device that was used to capture or record the analyzed image, as described herein. For example, the module 316 may infer the camera pose and/or shot composition from the face sizes, spatial configuration or arrangement, and/or degree of occlusion of faces and/or other entities detected in the image. In some embodiments, the camera pose estimation and classification module 316 infers, from the two-dimensional face/object/entity locations in an image, the camera height and the face positions in the X-Z plane relative to the camera center.

An outlier detection and reasoning module 318 analyzes the data generated by the foregoing modules regarding the detected faces/objects/entities and their three-dimensional positions and detects outliers; e.g., face/object/entity locations that do not conform to the camera model 210 (e.g., the assumption of uniform people/entity heights and poses). Rather than discarding the outliers, the module 318 uses the outliers to refining the parameter estimates, by performing 3D reasoning about the position of the outliers in relation to the inliers (e.g., face/object/entity locations that conform to the camera model 210) based on, for example, domain constraints that relate people's heights and poses (e.g., the semantic constraints 220). An ortho-rectification module 320 projects the estimated three-dimensional positions of the persons, faces, objects and/or other entities detected in the image by the entity interaction recognition system 112 onto the ground plane (e.g., to provide a camera-invariant view). The perspective rectification module 230 alternates between estimating camera parameters and applying positional constraints until convergence is reached, as described in more detail below, with reference to FIG. 5.

Figure 4:
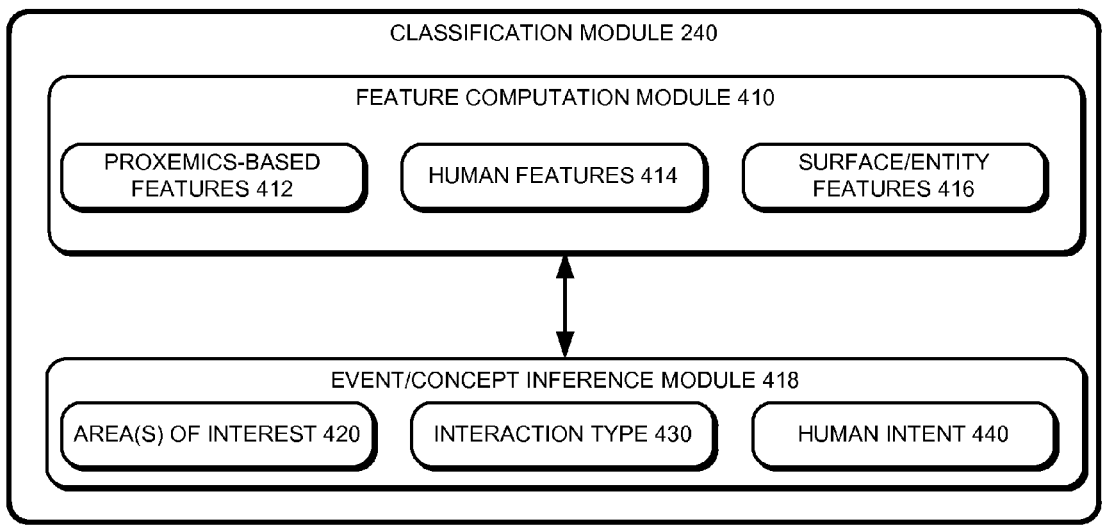
FIG. 4 is a simplified module diagram of at least one embodiment of the classification module of FIG. 2.

Referring now to FIG. 4, the classification module 240 classifies images as depicting particular types of entity interactions (e.g., human-human interactions, human-object interactions, and/or entity-object interactions), and/or areas of interest. To do this, the classification module 240 includes a feature computation module 410, which computes a number of feature descriptors from the low-level features of the image, and an event/concept inference module 418, which applies aspects of the interaction knowledge base 200 to infer interaction types and/or areas of interest from the computed features. In some embodiments, techniques for spatial and/or temporal pooling of computed features may be conducted based on an inferred area of interest (e.g., to analyze an inferred area of interest in greater detail or determine a "sub" area of interest within an area of interest).

The illustrative feature computation module 410 includes a proxemics-based feature computation module 412, a human feature computation module 414, and a surface/entity feature computation module 416. The proxemics-based feature computation module 412 constructs image features from low-level characteristics of the image based on the proxemics-based attributes 218 described above. In some embodiments, the proxemics-based features module 412 constructs features that are designed to reflect the information about the following attributes or cues: distance from camera to subject of the image, camera pose, shape (of people/entity arrangement, shot composition, and shape layers (e.g., foreground/background).

In some embodiments, the module 412 constructs shape cues from the image by finding the convex hull and the minimum spanning tree (MST) for the detected face locations in the X-Z plane. From these structures, the module 412 can measure statistics that capture the overall extent and orientation of the shape. The volume of the convex hull can be used to determine the spread of the shape. To measure directional spread, the eccentricity of its envelope ellipse can be computed by the module 412. The degree of Minimum Spanning Tree can be calculated and used by the module 412 to captures the overall structure of the shape. Analysis of the MST can then be performed. For example, high branching may indicate a compact shape, suggesting, e.g., an intimate photo, while low branching may indicate a linear shape e.g., suggesting a group photo.

In some embodiments, the module 412 constructs shot composition cues, by finding the numerosity of people/objects/entities and their visual distribution in the scene. In some embodiments, the module 412 may use the convex hull and find the number of points inside the hull as well as the ratio between inside and outside points. Such data can be analyzed by the module 412, e.g., values much less than 1 indicate high spread, e.g., suggesting a crowd photo. In some embodiments, the module 412 measures the visual distribution using three measures: a) horizontal skew: Using the extremal face/object/entity locations along X direction as anchors, the module 412 finds their center and computes standard deviation along X axis. b) depth skew: the module 412 computes the standard deviation of shape along the Z axis, and c) centeredness: the module 412 combines the deviations along the X and Z axes.

In some embodiments, the module 412 constructs distance cues, e.g., by measuring the average Euclidean distance between pairs of faces/objects/entities in the X-Z plane. In some embodiments, the module 412 looks at two types of distances: a) all pairs distance, which measures the spacing between each pair of faces, normalized by the image diagonal (which indicates the overall interpersonal distance in a group); b) nearest neighbor distance, which is calculated between faces along the Minimum Spanning Tree (and measures the localized interpersonal distances).

In some embodiments, the module 412 constructs camera pose cues, e.g., by quantizing the camera height into three levels: low-angle, eye-level and high-angle. The camera height is considered indicative of the intent of the shot (e.g., the intent of the person capturing or recording the image).

In some embodiments, the module 412 constructs shape layer cues, e.g., by determining whether people/objects/entities are arranged in a single group or in separate subgroups based on within and between layer distances and orientations. In some embodiments, the module 412 looks at inter-face/object/entity affinity, which is measured as follows: for each face/object/entity location, the module 412 finds its pairwise distance to all other faces/objects/entities and normalizes by the maximum distance. Then, the module 412 makes the pairwise distances symmetric by averaging distances between each pair. In some embodiments, the module 412 partitions the affinity matrix to discover subgroups. In some embodiments, the module 412 looks at inter face orientation, in which the module 412 computes angles between pairs of faces along the MST with reference to the X axis.

The human features computation module 414 computes a number of feature descriptors from the low-level features of the image that describe human features that are depicted in the image. In some embodiments, the module 414 computes facial landmarks, such as the width of the eyes, center of the eyes, nose tip, mouth corners, mouth center, eye corners, and/or nostrils. Such landmarks may be obtained from an existing facial recognition system, for example. In some embodiments, the module 414 computes the face size (e.g., in terms of height and width).

The surface/entity features computation module 416 computes a number of feature descriptors from the low-level features of the image that describe features of one or more surfaces that are depicted in the image. For example, the module 416 may analyze line segments, vanishing points, box layout, and/or surface labels (e.g., color, texture, position, and perspective cues).

The raw features constructed by the modules 412, 414, 416 may measure different types of statistics and thus on different scales. To fit the distribution of multiple features within a common scale, the feature computation module 410 may use a sigmoid function that converts feature values into probabilistic scores between zero and one. Additionally, some of the features may be meaningful within a certain range of values. Accordingly, the feature computation module 410 may shift a sigmoid function according to the threshold value to allow soft thresholding. To compute an aggregate feature from all the faces/objects/entities in an image, the feature computation module 410 may compute the mean and variance values of each feature and then fit the sigmoid function to re-adjust the values. The feature corresponding to an image may be a concatenated vector of these probability scores, in some embodiments.

The event/concept inference module 418 applies elements of the interactions knowledge base 200 to the features or combinations of features computed by the feature computation module 410, in order to draw inferences about the image from such features. To do this, the event/concept inference module 418 utilizes an areas of interest inference module 420 and/or an interaction type inference module 430. The areas of interest module may apply rules or logic to conclude that a particular feature or combination of features depicted in an image, and/or the spatial arrangements of such features, likely identifies an area of interest in the image. Some examples of areas of interest analyses are described below with references to FIGS. 6-8. The classification module 240 may transmit or otherwise make such inferences available to other components of the computing system 100 (e.g., the user-level applications 130), as described above.

The interaction type inference module 430 may apply, e.g., rules or logic, to conclude that a particular feature or combination of features depicted in an image, and/or the spatial configuration or arrangement of such features, correlates with a particular type of entity interaction. For example, the event/concept inference module 418 may determine, from the interactions knowledge base 200 or otherwise, that a particular combination of features likely indicates a group interaction, a family interaction or a public interaction, as discussed above.

Figure 5:
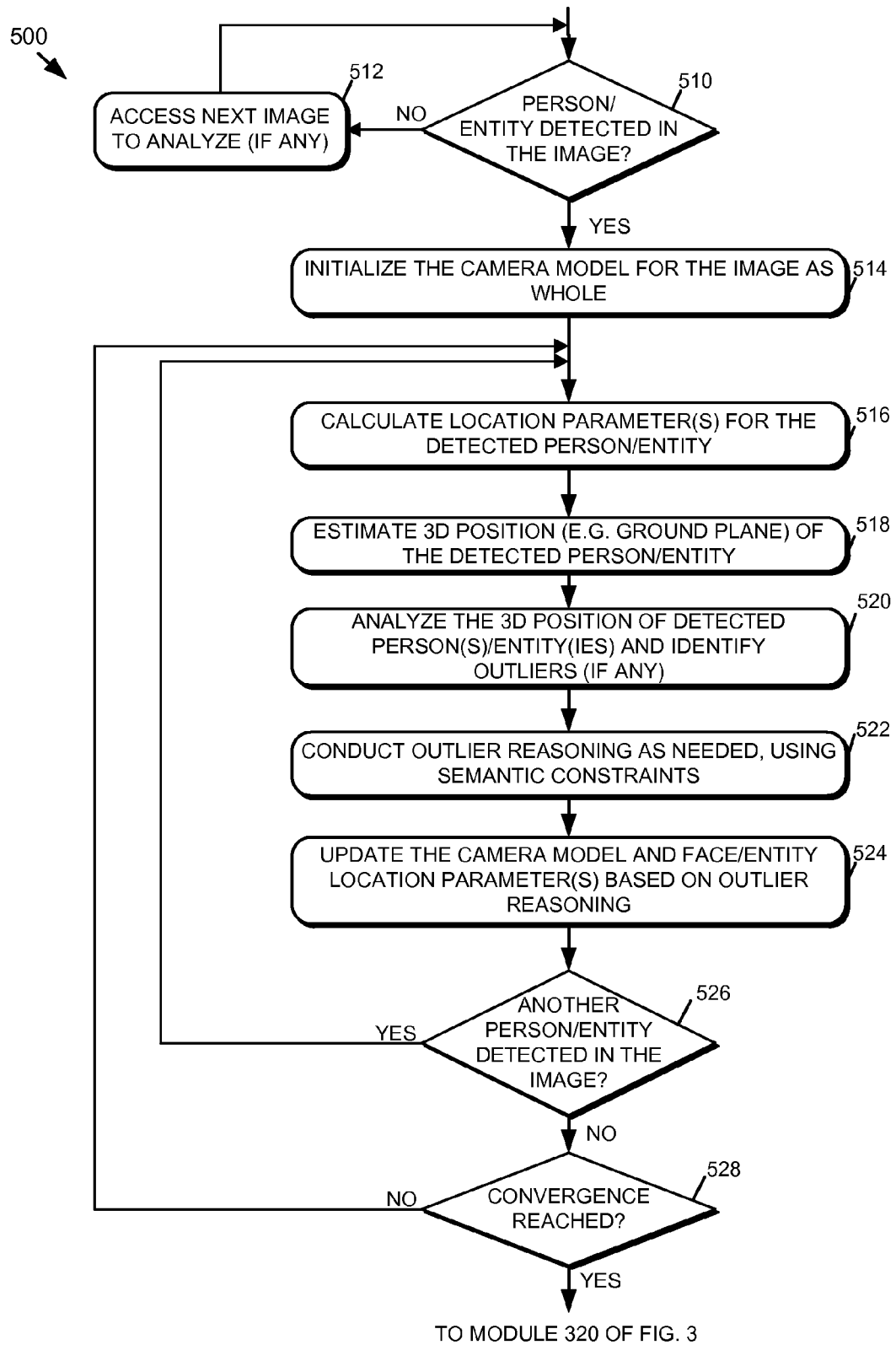
FIG. 5 is a simplified flow diagram of at least one embodiment of a method by which the computing system of FIG. 1 may perform perspective rectification.

Referring now to FIG. 5, an illustrative method 500 by which the computing system 100 may perform perspective rectification on an image is shown. The method 500 may be embodied as computerized programs, routines, logic and/or instructions executed by the computing system 100, for example by the image classification system 110 or the entity interaction recognition system 112. Among other things, the method 500 includes an algorithm to estimate person attributes (e.g., face depths, etc.), horizon line and camera height from 2D face locations in an image. At block 510, the computing system 100 determines whether a person attribute (e.g., a human face, hand, skin color, etc.) or other entity having a known attribute is detected in an image that is under analysis (using, e.g., a face detection system). If no such entity is detected, the system 100 proceeds to block 512, where it accesses another image to analyze (if any) and returns to block 510. If a person attribute or other known entity is detected in the image, then at block 514, the system 100 initializes the camera model (e.g., the camera model 210) for the image as a whole. For example, the system 100 may establish parameters of the coordinate system to be used to analyze the image, such as the camera center, etc.

At block 516, the system 100 calculates location parameter(s) for the person/entity detected at block 510. That is, the system 100 localizes the person/entity with respect to the image as a whole using e.g., x (horizontal) and y (vertical) coordinates. At block 518, the system 100 estimates the 3D position (e.g., ground plane) of the detected person/entity. To do this, the system 100 performs mathematical operations to transform the 2D coordinates of the detected person/entity to a 3D coordinate system. In some embodiments, the mathematical operations may include a linear least squares method. The system 100 estimates the 3D distance in depth from the camera center and the horizontal distance from the camera center. Using these coordinates, the system 100 "undos" the perspective projection of the 2D image and recovers the perspective rectified person layout in the 3D coordinate system. In some embodiments, the system 100 solves a mathematical equation to relate the world height of the detected person/entity to its image height through its vertical position in the image and through two unknowns— the camera height and the horizon line. In some embodiments, given N>=2 persons/entities in an image, a system of linear equations results, which the system 100 can simultaneously solve for the two unknowns by minimizing the linear least squares error.

Referring now to block 520, to obtain meaningful camera parameters, the system 100 filters out irregular observations that violate the camera model 210. In some embodiments, a Random Sample Consensus (RANSAC) algorithm is employed to reject these so-called outliers to get robust estimates. RANSAC is an iterative framework with two steps: first, a minimal sample set (e.g., 2 person/entity locations) is selected and model parameters are computed by the least squares estimator (as explained above). Each instance of the observation set is checked for consistency with the estimated model. The illustrative method 500 estimates the face/entity height in the image according to the model and computes the deviation from the observed height to find the estimator error for that person/entity. In some embodiments, outliers are considered to be instances of detected persons/entities whose summed errors over all the iterations exceed a pre-defined threshold, which may vary according to the requirements of a particular requirements or design of the system 100. Thus, at block 520, the persons/entities that violate the assumptions incorporated into the camera model 210 are detected as outliers in the RANSAC step.

Referring now to block 522, conventionally, outliers are treated as noisy observations and rejected from estimates. As discussed above, outlier faces/entities may occur because of variations in face/entity sizes and heights arising due to difference in age, pose (sitting versus standing) and physical planes of reference (ground level or on a platform). Rather than eliminating outliers from consideration, the system 100 reasons about them and restores them in its calculations. To do this, the system applies the semantic constraints 220 as discussed above, to constrain the possible depth orderings of the outlier faces/entities in the image.

In some embodiments, for each outlier in the image, the system 100 determines if the outlier shares a visibility constraint with any of the inliers. The system 100 maintains an index of all such pairs. Each such (outlier, inliers) pair is assumed to share a common ground plane (faces/entities are resting/standing/sitting on the same ground level). The system 100 then refines the height estimates for the outliers, based on this assumption.

In some embodiments, to apply the localized pose constraint (discussed above), the system 100 determines, for each outlier in the image, if the outlier has inlier neighbors of an outlier instance j along horizontal coordinates in the image. If the difference in the face/entity size of the outlier in comparison to the corresponding measurements for the outlier's inlier neighbors is within a threshold, then the system 100 modifies the depth of the outlier within the vicinity of the neighboring inliers. The system 100 may perform this constraint test to identify (outlier, inliers) pairs that satisfy the localized pose constraint. These pairs may then be used to refine the height estimates of the outliers as discussed below.

As discussed above, the height estimates of the detected outliers may be refined using the semantically constrained set of inliers. In some embodiments, the system 100 applies a piecewise constant ground plane assumption in the image to estimate the outlier heights in the world. By assuming that the outliers are located at the same level as the related inliers, the world height of the outliers can calculated in proportion to the inliers. Given the body height of an outlier and the ground plane approximation for a neighboring inlier, the ground level can be calculated by translating the vertical position of the face/person/entity by a quantity proportional to the image height (e.g., face/person/entity size may be assumed to be x times the body size). The body height of the outlier may be based on the average ground plane estimated from its inliers. The face/person/entity height is then calculated as a fraction of the estimated body height.

Referring now to block 524, the system 100 updates the camera model and the face/person/entity location parameters based on the outlier reasoning performed at block 522. The new face/person/entity height ratios are inputs to the next round of outlier detection (block 520) to produce new estimates of face/person/entity depths and camera heights. The system 100 performs the above described analysis for each of the faces/persons/entities detected in the image, or, in some embodiments, a selected subset thereof (e.g., only the non-occluded faces/persons/entities) (block 526 returns to block 516). In some embodiments, the system iterates the method 500 until convergence is reached (e.g., until there are no more "unresolved" outliers) (block 528 returns to block 516). Following block 528, if convergence is reached, the system 100 proceeds to module 320 of FIG. 3, described above.

Figure 10:
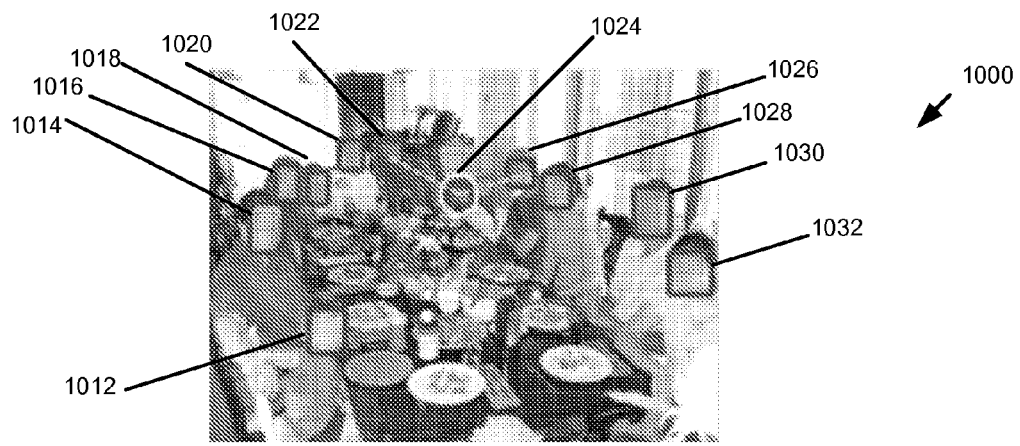
FIGS. 10-15 are examples of images in which entity interactions depicted in images are algorithmically recognized using the various techniques disclosed herein.

An example of a proxemics based interaction analysis of an image that may be conducted e.g., by the entity interaction recognition system 112 using the perspective rectification method 500 is shown in FIG. 10. An image 1000 depicts a number of human faces 1012, 1014, 1016, 1018, 1020, 1022, 1024, 1026, 1028, 1030, and 1032. (In the figures, human faces are occluded for privacy). The system 112 identifies the face 1024 as an outlier because it is not at the same vertical height as the neighboring faces. The system 112 applies the localized pose constraint to conclude that the person 1024 is a child while the neighboring faces belong to adults. Moreover, the system 112 determines that the shape of the spatial arrangement of the faces in the image 1000 is convex, and that the picture-taker used a high-angle shot. The system 112 infers, from this combination of factors, that the image 1000 most likely represents a group picture (as opposed to, e.g., a crowd scene).

Figure 6:
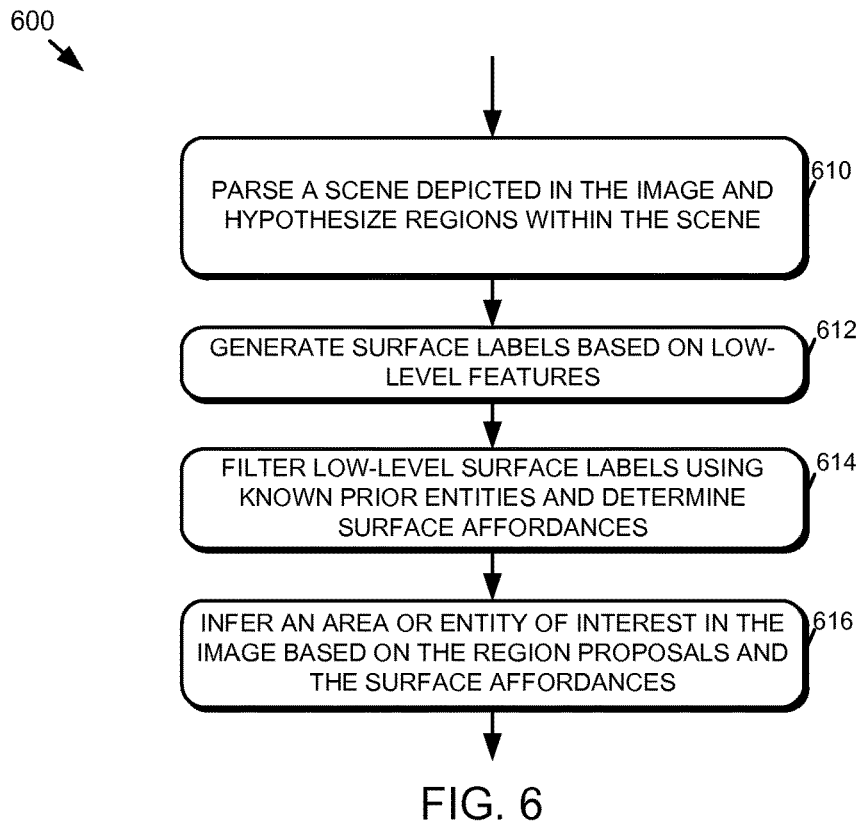
FIG. 6 is a simplified flow diagram of at least one embodiment of a method by which the computing system of FIG. 1 may infer an area or entity of interest in an image based on a surface layout analysis.

Referring now to FIG. 6, an illustrative method 600 by which the computing system 100 may infer an area or entity of interest in an image based on a surface layout analysis is shown. The method 600 may be embodied as computerized programs, routines, logic and/or instructions executed by the computing system 100, for example by the image classification system 110 or the entity interaction recognition system 112. At block 610, the system 100 analyzed a scene that is depicted in an image that is under analysis. The scene is parsed to its constituent elements in order to draw inferences about a depicted person's interaction with his or her environment. At block 612, the system 100 generates low-level surface labels, such as color, texture, position, perspective cues, etc., for one or more of the surfaces detected through the parsing of block 610. At block 614, the system 100 uses one or more known priors (e.g., faces, people, objects) to filter the surface labels prepared at block 612 to a subset thereof, which may constitute surfaces of possible interest in relation to the known prior(s). At block 614, the system 100 also determines possible surface affordances; that is, potential functions or uses of the surfaces in the filtered subset, based on their spatial relationship to the known prior(s). At block 616, the system 100 infers an area or entity of interest in the image based on the region proposals generated at block 610 and the surface affordances determined at block 614. The system 100 may generates such inferences using, for example, one or more of the models of the interactions knowledge base 200.

Figure 11:
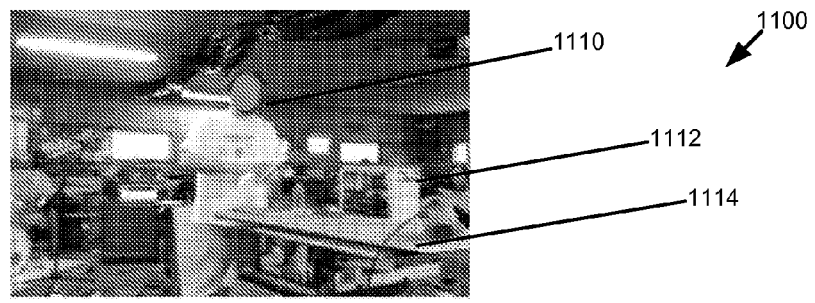
Figure 12:
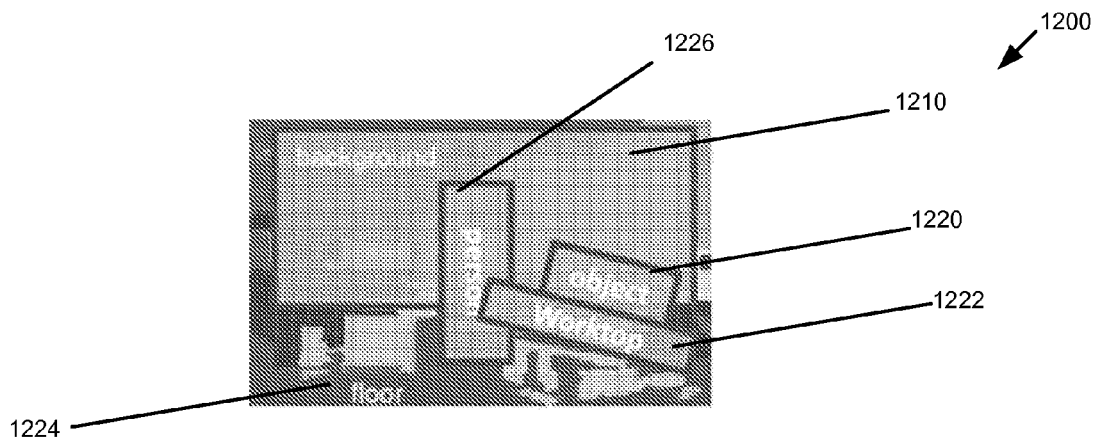

As an example, if, as shown in the illustrative image 1100 of FIG. 11, the system 100 detects a human face 1110 and detects that a portion of the person's body is occluded by a surface 1114, the system 100 may infer that the person 1110 is standing behind the surface 1114. Further, the system 100 may detect an object 1112 (e.g., based on a known attribute), and infer, based on the object 1112's spatial relationship to the surface 1114, that the surface is likely to be a table that is supporting the object. Still further, the system 100 may analyze the spatial relationships between the surface 1114, the object 1112, and the person 1110, and infer that the person 1110 is likely operating, manipulating, or otherwise working with the object 1112, which is positioned on the surface 1114. As a result, the system 100 may classify the surface 1114 as a "worktop" and the interaction as "person working with tool." The system 100 may engage in further recognition analysis to try to ascertain more specifically the type of tool that the person is working with, and thus further clarify the interaction type. An example of a semantic representation of these system-generated inferences is shown in FIG. 12. In FIG. 12, an area of the image 1200 is identified as the background, another area of the image is identified as the floor 1224, and the entities of interest, person 1226, object 1220, and worktop 1222 are identified.

Figure 7:
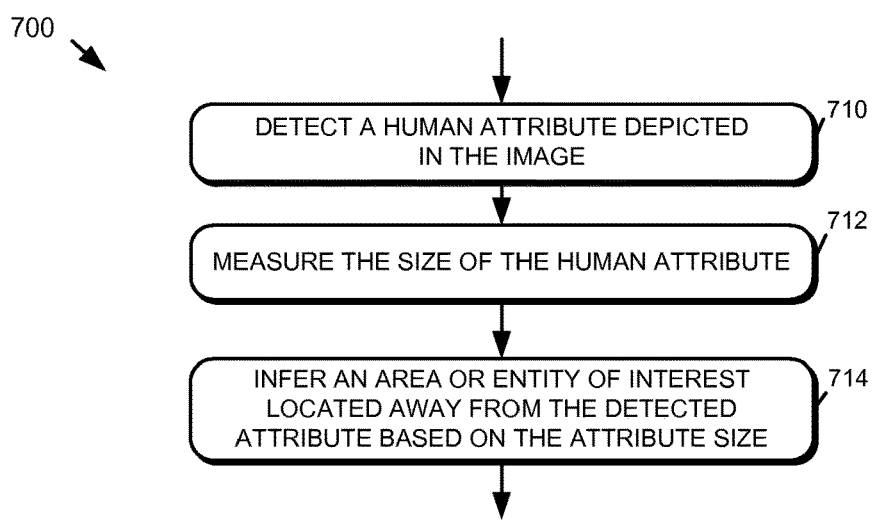
FIG. 7 is a simplified flow diagram of at least one embodiment of a method by which the computing system of FIG. 1 may infer an area or entity of interest in an image using a human attribute-based analysis.

Referring now to FIG. 7, an illustrative method 700 by which the computing system 100 may infer an area or entity of interest in an image using a human attribute-based analysis is shown. The method 700 may be embodied as computerized programs, routines, logic and/or instructions executed by the computing system 100, for example by the image classification system 110 or the entity interaction recognition system 112. At block 710, the system 100 detects a human attribute (e.g., a human face) depicted in an image that is under analysis (using, e.g., a face detection system). At block 712, the system 100 measures the size of the detected attribute in relation to the image as a whole (using, e.g., number of pixels, etc.). At block 714, the system 100 compares the measured attribute size to upper and lower boundary threshold values. If the measured attribute size is larger than the upper boundary value, the system 100 infers that the person or attribute is the primary subject of the image, and there is likely no other area of interest in the image. Conversely, if the measured attribute is smaller than the lower boundary value, the system 100 infers that the person or attribute is likely an insignificant feature, or one of many features, of the image, and specifies the area of interest as corresponding to the entire image. If the measured attribute falls between the upper and lower boundary values, the system 100 calculates horizontal and vertical bias values and specifies the appropriate scale, and infers an area of interest as a function of these values. In some embodiments, the x and y bias values may be determined with reference to the center of the image, and may be based on the differences between the measured attribute size and each of the boundary values. The scale may be determined based on the magnitude of the attribute size, e.g., if the attribute size is larger, the inferred area of interest may be proportionately smaller and vice versa.

Figure 13:
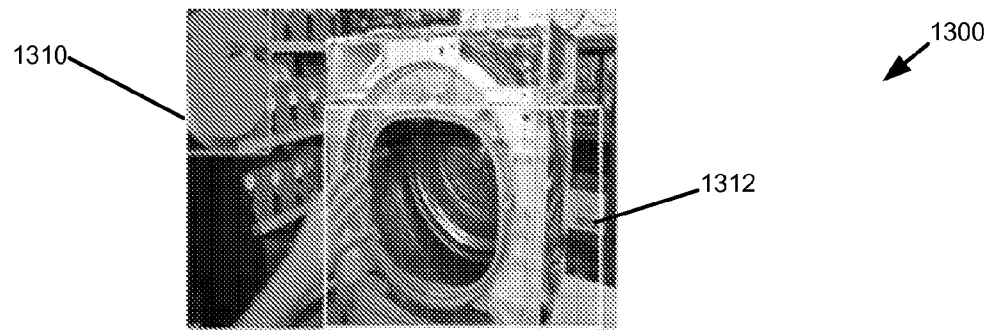

FIG. 13 illustrates an example of an image that has undergone a face-based area of interest analysis. A face 1310 is detected in the upper left corner of the image. Based on the relatively small size of the face 1310, the system 1110 infers an area of interest 1312, which is larger by some degree of scale. Further, based on the location of the face 1310 to the far left of the image center, the system 100 infers that the area of interest is located around the center of the image and to the right. The system generates such inferences using, for example, one or more of the models of the interactions knowledge base 200, described above.

Figure 8:
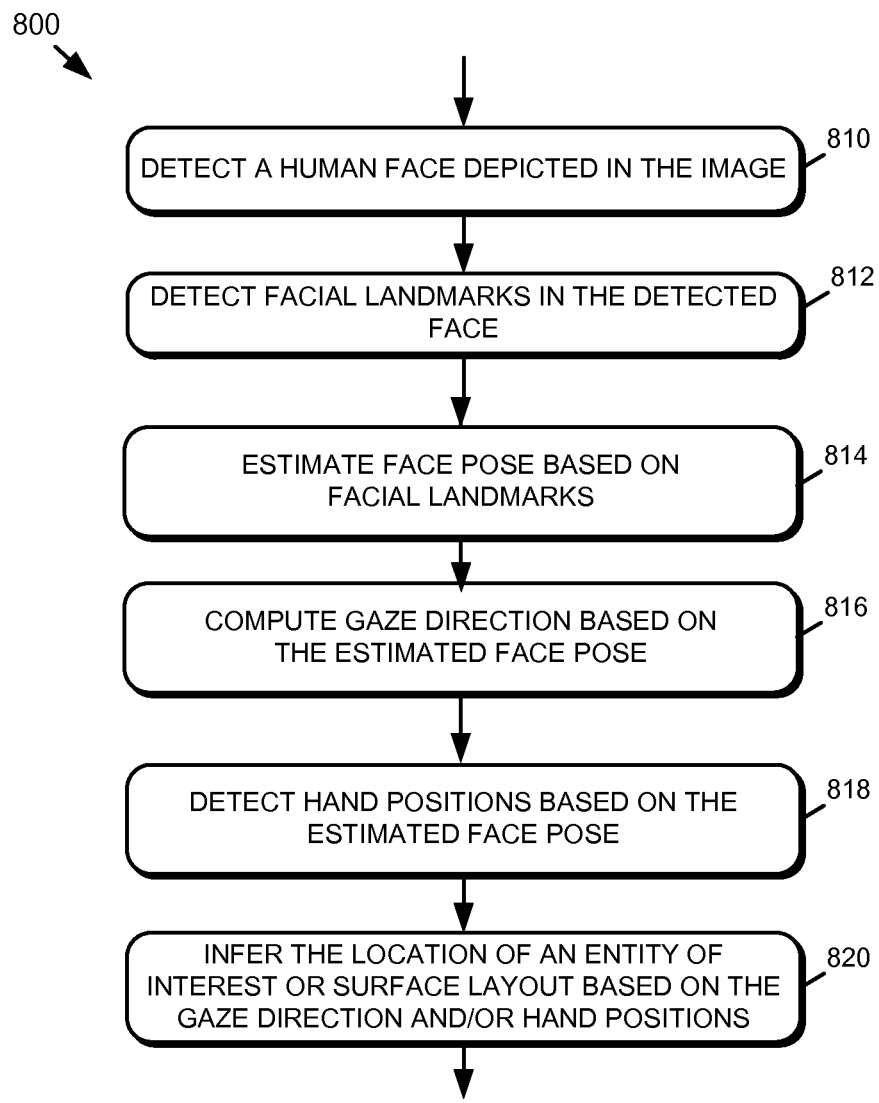
FIG. 8 is a simplified flow diagram of at least one embodiment of a method by which the computing system of FIG. 1 may infer an area or entity of interest in an image using gaze direction and/or hand position.

Referring now to FIG. 8, an illustrative method 800 by which the computing system 100 may infer an area or entity of interest in an image using gaze direction and/or hand position is shown. The method 800 may be embodied as computerized programs, routines, logic and/or instructions executed by the computing system 100, for example by the example by the image classification system 110 or the entity interaction recognition system 112. At block 810, the system 100 detects a human face depicted in an image that is under analysis (using, e.g., a face detection system). At block 812, the system 100 detects or determines facial landmarks in the detected face (e.g., as described above with reference to FIG. 4). For example, the detected faces and landmarks may be obtained from another computer application or system, in some embodiments. In some embodiments, the facial landmarks may tend to indicate one or more characteristics of the detected person's gaze, and may include, for example, the center of the eyes, the corners of the eyes, the distance between the eyes, nose tip, etc.

At block 814, the system 100 estimates the three-dimensional face pose of each detected person based on the facial landmarks computed at block 812. The face pose may be estimated using, for example, the three-dimensional face depth computations discussed above. At block 816, the system 100 computes the direction of the detected person's gaze based on the estimated face pose. To do this, gaze volume estimation techniques may be used. For example, the system 100 may model gaze volume as a cone-shaped distribution with the apex located at the center of the eyes (as detected at block 812). In some embodiments, the system 100 may calculate a gaze ray as a 3D ray that emanates from the eye center, perpendicular to the face plane.

Figure 14:
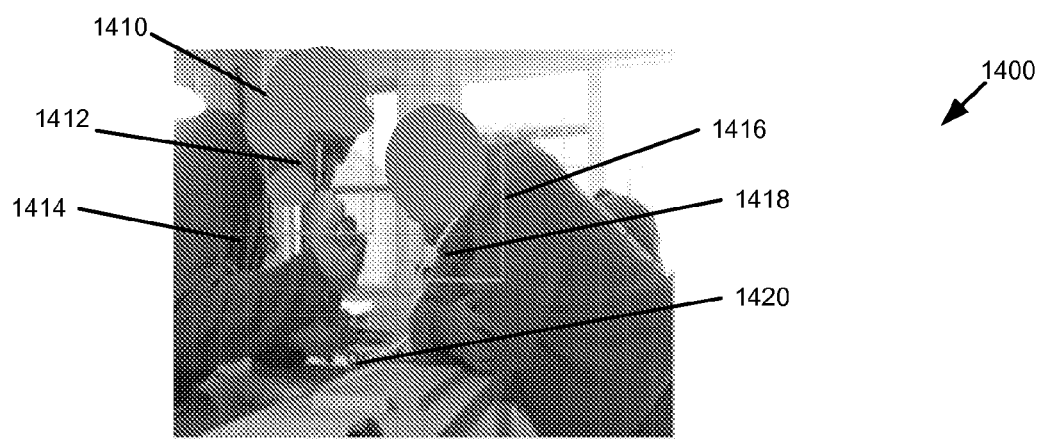

An example of an image in which gaze direction has been estimated is shown in FIG. 14. In FIG. 14, faces 1410, 1416 are detected and eye centers are located for each of the people depicted in the image. A gaze direction 1412, 1418 is calculated for each of the detected people. From the respective gaze rays, the system 100 infers an area of interest 1420.

At block 818, the system 100 estimates likely hand positions based on the estimated face pose determined at block 816. In FIG. 14, system-estimated hand positions 1414, 1418 are shown. At block 820, the system 100 infers the location of an entity of interest (which may include a possible surface layout), based on the gaze direction and/or hand positions computed at blocks 814 and 818 using, for example, one or more of the models of the interactions knowledge base 200.

Figure 15:
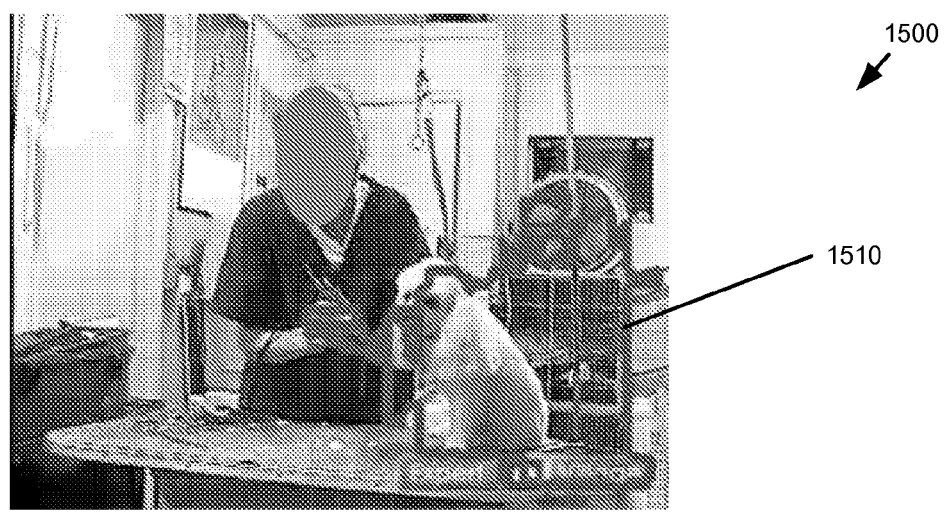

FIG. 15 illustrates an example of an image in which the system 100 has used a face pose analysis to filter objects of possible interest in the image. Initially, an object detection algorithm may have detected a number of possible objects of interest in the image, such as the pet, the table, and the cages in the background. Here, the system 100 has detected a face pose based on facial landmarks as described above, and identified the area 1510 as a more likely area of interest out of a number of possible areas of interest in the image.

With regard to the methods 600, 700, 800, it should be appreciated that while not specifically shown, any of these methods may be repeated by the system 100 to infer other areas of interest outside of or within the same area of interest, or to further analyze previously inferred areas of interest, or for other reasons. Further, any of these methods may be used in combination with one another and/or in combination with the method 500, or any other portions of the system 100 (e.g., the interactions kb 200, the classification module 240, or portions of any of these). For example, a face size-based area of interest analysis may be followed by a gaze-based analysis or a surface layout analysis may be followed by a face pose and/or hand location analysis. As another example, perspective rectification or proxemics analysis as discussed above may be performed only on certain areas of interest within an image, in some embodiments. That is, an area of interest may be identified (e.g., based on face size and location) and then perspective rectification and/or proxemics analysis may be performed only on the identified area of interest. Many other combinations of the foregoing techniques are possible, to further refine or clarify the image classification to a finer degree of granularity, or for other reasons.

Implementation Examples

Figure 9:
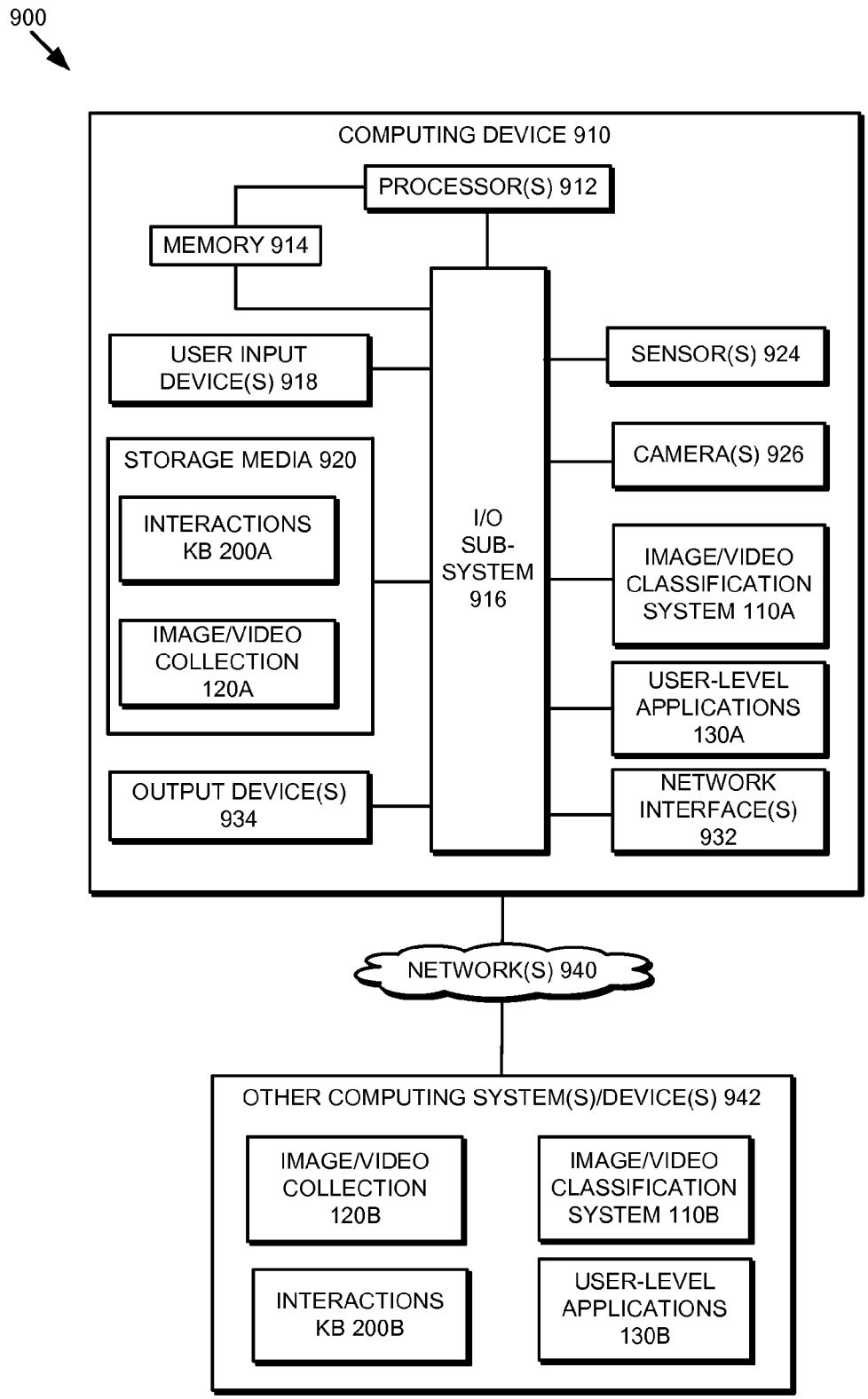
FIG. 9 is a simplified block diagram of an exemplary hardware environment with which at least one embodiment of the computing system of FIG. 1 may be implemented.

Referring now to FIG. 9, a simplified block diagram of a hardware environment 900 in which the illustrative computing system 100 may be implemented is shown. While the computing system 100 is shown as involving multiple components and devices, it should be understood that in some embodiments, the computing system 100 may constitute a single computing device, alone or in combination with other devices.

The illustrative computing system 100 includes a computing device 910, which may be in communication with one or more other computing systems or devices 942 via one or more networks 940. Illustratively, portions 110A, 130A of the image/video classification system 110 and user-level applications, respectively, are local to the computing device 910, while other portions 110B, 130B are distributed across one or more other computing systems or devices 942 that are connected to the network(s) 940. Similarly, portions 120A, 200A of the illustrative image/video collection 120 and interactions kb 200, respectively, are local to the computing device 910 while other portions 120B, 200B are distributed across one or more of the other computing systems or devices 942. In other embodiments, however, the image/video classification system 110, the interactions kb 200, the user-level applications 130 and/or the image/video collection 120 may be located entirely on the computing device 910 or portions of each may be located on different computing devices. In some embodiments, portions of any of these components 110, 120, 130, 200 may be incorporated into other systems or interactive software applications. Such applications or systems may include, for example, operating systems, middleware or framework software, and/or applications software. For example, portions of the components 110, 120, 130, 200 may be incorporated into or accessed by other, more generalized search engine or intelligent assistance applications.

The illustrative computing device 910 includes at least one processor 912 (e.g. a microprocessor, microcontroller, digital signal processor, etc.), memory 914, and an input/output (I/O) subsystem 916. The computing device 910 may be embodied as any type of computing device such as a personal computer (e.g., desktop, laptop, tablet, smart phone, body-mounted device, etc.), a server, an enterprise computer system, a network of computers, a combination of computers and other electronic devices, or other electronic devices.

Although not specifically shown, it should be understood that the I/O subsystem 916 typically includes, among other things, an I/O controller, a memory controller, and one or more I/O ports. The processor 912 and the I/O subsystem 916 are communicatively coupled to the memory 914. The memory 914 may be embodied as any type of suitable computer memory device (e.g., volatile memory such as various forms of random access memory).

The I/O subsystem 916 is communicatively coupled to a number of hardware components and/or other computing systems including one or more user input devices 918 (e.g., a touchscreen, keyboard, virtual keypad, microphone, etc.), one or more storage media 920, one or more sensors 924 (e.g., optical sensor, accelerometer, proximity sensor, compass, etc.), one or more video and/or still-image cameras 926, one or more network interfaces 932, and one or more output devices 934 (e.g., speakers, displays, LEDs, etc.). It should be understood that each of the foregoing components and/or systems may be integrated with the computing device 910 or may be a separate component or system that is in communication with the I/O subsystem 916 (e.g., over a network). For instance, the user-level applications 130 may be embodied as separate systems.

The storage media 920 may include one or more hard drives or other suitable data storage devices (e.g., flash memory, memory cards, memory sticks, and/or others). In some embodiments, portions of systems software (e.g., an operating system, etc.), framework/middleware (e.g., application-programming interfaces, object libraries, etc.), and the components 110, 120, 130, 200 reside at least temporarily in the storage media 920. Portions of systems software, framework/middleware, and the components 110, 120, 130, 200 may be copied to the memory 914 during operation of the computing device 910, for faster processing or other reasons.

The network interface(s) 932 may communicatively couple the computing device 910 to one or more communication networks, e.g., a local area network, wide area network, personal cloud, enterprise cloud, public cloud, and/or the Internet, for example. Accordingly, the network interfaces 932 may include one or more wired or wireless network interface software, firmware, or hardware, for example, as may be needed pursuant to the specifications and/or design of the particular computing system 100.

The other computing device(s) 942 may be embodied as any suitable type of computing device such as any of the aforementioned types of devices or other electronic devices. For example, in some embodiments, the other computing devices 942 may include one or more server computers used to store portions of the components 110, 120, 130, 200. The computing system 100 may include other components, sub-components, and devices not illustrated in FIG. 9 for clarity of the description. In general, the components of the computing system 100 are communicatively coupled as shown in FIG. 9 by signal paths, which may be embodied as any type of wired or wireless signal paths capable of facilitating communication between the respective devices and components.

Additional Examples

In at least one example, the present disclosure provides a system that uses detected objects of known dimension to infer 3D arrangement of the objects, camera parameters and 3D environments (e.g., ground plane) in a single image or in a video sequence. In another example, the present disclosure provides a system that uses faces, people, or vehicle to infer 3D arrangement of the objects, camera parameters and 3D environments (e.g. ground plane) in a single image or in a video sequence. In another example, the present disclosure provides a system that uses 3D arrangement of faces, people or vehicles computed from a single image or in a video sequence to infer their interactions, such as whether or not they are facing each other, whether or not they are moving towards each other, whether or not they can reach or contact each other, etc. In another example, the present disclosure provides a system that uses detected objects of known attributes, their configurations and their poses to infer region of interest additional objects of interest (e.g., from gaze, hand locations, hand and body poses and configurations, the system identifies regions or locations of objects being manipulated by a person or persons in an image or a video). In another example, the present disclosure provides a system that uses detected objects of known attributes and their configuration to infer region of interest additional objects of interest for a given event or activities that a user would like to search or detect (e.g., from gaze and hand locations and configurations, the system identifies regions or locations as the focus of attention for classification in order to distinguish two similar events or activities based on what objects being manipulated by a person or persons in an image or a video). In another example, the present disclosure provides a system that uses detected objects of known attributes and their configuration to infer the pose of objects of interest (e.g., from computed face pose, the system biases on the location and potential body pose of the person). In another example, the present disclosure provides a system that uses detected objects of known attributes and their visibility to infer the type of the layout of the scene and the layout and existence of the objects. For example, if a person is detected and his/her lower body is not visible, the system infers and biases (through a prior distribution) the existence of a table, counter or other occluding objects. In another example, from the foot location of a detected person, the system can determine the ground location, and the location of tables and working space with which the person can interact. In another example, the present disclosure provides an information retrieval system that automatically converts a user query into a set of events, actions, objects, object relationships, regions of interest related to objects and their interactions in order to retrieve the query results.

In at least one example, a method for recognizing an entity interaction depicted in a two-dimensional image or a video, where the entity interaction involves an entity depicted in the image, includes, with a computing system, algorithmically, detecting the entity in the image; estimating a three-dimensional spatial configuration of the entity in the image; and classifying the image as depicting a type of entity interaction involving the detected entity based on the estimated three-dimensional spatial configuration of the detected entity.

The entity may include a person depicted in the image, and the method may include classifying the image as depicting a type of human interaction involving the person. The method may include detecting a non-person entity in the image, estimating a three-dimensional arrangement of the person and the non-person entity as depicted in the image, and classifying the image as depicting a type of human interaction involving the person and the non-person entity based on the estimated three-dimensional arrangement of the person and the non-person entity. The method may include detecting a plurality of persons depicted in the image, estimating a three-dimensional position of each of the persons in the detected plurality of persons, and classifying the image as depicting a type of human interaction involving at least one of the detected persons based on the estimated three-dimensional position of each of the persons in the detected plurality of persons. The method may include detecting a plurality of persons depicted in the image, estimating a three-dimensional arrangement of the detected plurality of persons, and classifying the image as depicting a type of human interaction involving the detected plurality of persons based on the estimated three-dimensional arrangement of the detected plurality of persons.

The method may include determining a proxemics class associated with the three-dimensional arrangement of the persons depicted in the image, wherein the proxemics class represents a commonly occurring human interaction. The method may include estimating a parameter of a device likely used to capture or record the image, and using the estimated parameter of the device likely used to capture or record the image to determine the proxemics class. The method may include estimating a three-dimensional arrangement of a plurality of entities depicted in the image, and classifying the image as depicting a type of entity interaction involving the plurality of entities based on the estimated three-dimensional arrangement of the plurality of entities. The image may depict a live physical reality observed by a user of a device used to capture the image, and the method may include presenting a suggestion to the user based on the type of human interaction associated with the classified image. The method may include tagging the image with a plurality of semantic elements usable to describe the type of human interaction associated with the classified image and storing the semantic elements in computer memory. The method may include converting user input into a computer-executable search query comprising one or more of the semantic elements. The method may include repeating the detecting and estimating for a second entity depicted in the image, and modifying the classification of the image based on the estimated three-dimensional position of the second entity. The method may include inferring an area of interest or an entity of interest in the image based on the estimated three-dimensional spatial configuration of the at least one detected entity.

In at least one example, a computer application may include one or more of an image/video tagger, an information retrieval system, and an intelligent assistant, where the computer application is embodied in one or more machine accessible storage media, and the computer application includes instructions accessible by one or more processors to cause the one or more processors to execute any of the foregoing methods. In some examples, a computing system may include one or more processors and one or more machine accessible storage media having embodied therein any of the foregoing computer applications.

In at least one example, a method for inferring an area of interest in a two-dimensional image depicting at least one entity includes, with a computing system, algorithmically, locating the at least one entity in the image; determining, from the image, a spatial configuration of at least a portion of the at least one entity located in the image; and inferring an area of interest in the image based on the location of the at least one entity and the determined spatial configuration, the area of interest at least partially spaced from the at least one entity, the area of interest having a size that is greater than zero and less than the size of the entire image. One or more of the entities may include a person, and the method may include inferring the area of interest based on the location of the person in the image and the determined spatial configuration.

The plurality of characteristics may include a face pose and a hand location of the person, and the method may include estimating the face pose, estimating the hand location based on the estimated face pose, and inferring the area of interest based on the estimated face pose and the estimated hand location.

The spatial configuration may include an estimated face pose of the person, and the method may include computing a direction of the person's gaze from the estimated face pose, and inferring the area of interest based on the computed direction of the person's gaze. The method may include estimating a location of the person's hand and inferring the area of interest based on the location of the person's hand. The area of interest may include a plurality of entities of possible interest, and the method comprises filtering the plurality of entities of possible interest to a smaller number of entities of possible interest based on the determined spatial configuration of the at least one entity depicted in the image. The inferring an area of interest may include inferring a three-dimensional area of interest in the recorded two-dimensional image.

The at least one entity may include a person and the method may include estimating a three-dimensional position of the person from the determined plurality of characteristics, analyzing the three-dimensional position of the person using a proxemics analysis, determining a type of human interaction likely depicted in the image based on the proxemics analysis, and inferring the area of interest based on the determined type of human interaction.

In at least one example, a computer application may include one or more of an image/video tagger, an information retrieval system, and an intelligent assistant, where the computer application is embodied in one or more machine accessible storage media, and the computer application includes instructions accessible by one or more processors to cause the one or more processors to execute any of the foregoing methods. In at least one example, a computing system may include one or more processors and one or more machine accessible storage media having embodied therein any of the foregoing computer applications. The method may include detecting an attribute of the person depicted in the image, computing the size of the attribute detected in the image, comparing the size of the detected attribute to a threshold size, and inferring the area of interest in the image based on the comparison of the size of the detected attribute to the threshold size. The attribute of the person may include the person's face, and the method may include computing the size of the detected face, comparing the size of the detected face to a threshold face size and inferring the area of interest in the image based on the comparison of the size of the detected face to the threshold face size. The inferred area of interest may include a plurality of entities of possible interest and the method may include using one or more characteristics of one or more of the entities of possible interest to filter the plurality of entities of possible of interest to a smaller number of entities of possible interest. The at least one entity may include a surface, and the method may include determining a three-dimensional arrangement of the surface and another entity depicted in the image based on a characteristic of the surface. The method may include associating a surface affordance with the surface based on the characteristic of the surface and the three-dimensional arrangement of the surface and a person depicted in the image.

In at least one example, a method for detecting a characteristic of a gaze of a person depicted in a recorded two-dimensional image includes, with a computing system, algorithmically detecting the person in the recorded two-dimensional image; estimating a three-dimensional spatial configuration of at least a portion of the person in the image; and inferring a characteristic of the person's gaze in the image based on the estimated spatial configuration.

The estimated spatial configuration comprises an estimated head pose of the detected person and the method comprises inferring a characteristic of the person's gaze in the image based on the estimated head pose. The method may include classifying the recorded two-dimensional image as depicting a type of human interaction based on the inferred characteristic of the person's gaze. The recorded image may include a plurality of images and the method may include tracking the person's gaze by repeating the detecting, estimating, and inferring for the plurality of images over a time period, and reclassifying the recorded image as depicting a different type of human interaction based on the tracking of the person's gaze over the time period. The method may include determining a proxemics class associated with the recorded two-dimensional image based on the estimated spatial configuration, and inferring an area of interest in the image at least partially spaced from the detected person based on the proxemics class.

The method may include inferring a direction of the person's gaze, and inferring an area of interest in the recorded two-dimensional image based on the direction of the person's gaze, wherein the area of interest at least partially spaced from the person, and the area of interest has a size that is greater than zero and less than the size of the entire recorded two-dimensional image. The inferring an area of interest may include inferring a three-dimensional area of interest from the recorded two-dimensional image.

In at least one example, a computer application may include one or more of an image/video tagger, an information retrieval system, and an intelligent assistant, where the computer application is embodied in one or more machine accessible storage media, and the computer application includes instructions accessible by one or more processors to cause the one or more processors to execute any of the foregoing methods. In at least one example, a computing system may include one or more processors and one or more machine accessible storage media having embodied therein any of the foregoing computer applications.

General Considerations

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to effect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

Modules, data structures, blocks, and the like are referred to as such for ease of discussion, and are not intended to imply that any specific implementation details are required. For example, any of the described modules and/or data structures may be combined or divided into sub-modules, sub-processes or other units of computer code or data as may be required by a particular design or implementation. In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application-programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure.

This disclosure is to be considered as exemplary and not restrictive in character, and all changes and modifications that come within the spirit of the disclosure are desired to be protected. For example, while certain aspects of the present disclosure may be described in the context of user-generated or "in the wild" images and videos, it should be understood that the various aspects are applicable to other types of captured or recorded visual media and multimedia events, such as surveillance videos, animated presentations, professionally-produced photographs and videos, recorded commercials, television shows, feature films, and the like.

The invention claimed is:

1. A method for inferring an area of interest in a two-dimensional image depicting at least one person, the method comprising, with a computing system, algorithmically:

locating the at least one person in the image;

determining, from the image, a spatial configuration of at least a portion of the at least one person located in the image;

estimating a three-dimensional position of the person from the determined spatial configuration;

analyzing the three-dimensional position of the person using a proxemics analysis;

determining a type of human interaction likely depicted in the image based on the proxemics analysis; and inferring an area of interest in the image based on the determined type of human interaction, the area of interest at least partially spaced from the at least one person, and the area of interest having a size that is greater than zero and less than the size of the entire image.

2. The method of claim 1, wherein the method comprises further inferring the area of interest based on a location of the person in the image and a spatial configuration determined for a plurality of characteristics of the person.

3. The method of claim 2, wherein the plurality of characteristics comprises a face pose and a hand location of the person, and the method further comprises estimating the face pose, estimating the hand location based on the estimated face pose, and inferring the area of interest based on the estimated face pose and the estimated hand location.

4. The method of claim 2, wherein the spatial configuration comprises an estimated face pose of the person, and the method comprises computing a direction of the person's gaze from the estimated face pose, and inferring the area of interest based on the computed direction of the person's gaze.

5. The method of claim 4, further comprising estimating a location of the person's hand and inferring the area of interest based on the location of the person's hand.

6. The method of claim 1, wherein the area of interest comprises a plurality of entities of possible interest, and the method comprises filtering the plurality of entities of possible interest to a smaller number of entities of possible interest based on a determined spatial configuration of at least one entity depicted in the image.

7. The method of claim 1, comprising detecting an attribute of the person depicted in the image, computing a size of the attribute detected in the image, comparing the size of the detected attribute to a threshold size, and inferring the area of interest in the image based on the comparison of the size of the detected attribute to the threshold size.

8. The method of claim 7, wherein the attribute of the person comprises the person's face, and the method comprises computing the size of the detected face, comparing the size of the detected face to a threshold face size and inferring the area of interest in the image based on the comparison of the size of the detected face to the threshold face size.

9. The method of claim 1, wherein the inferred area of interest comprises a plurality of entities of possible interest and the method comprises using one or more characteristics of one or more of the entities of possible interest to filter the plurality of entities of possible of interest to a smaller number of entities of possible interest.

10. The method of claim 1, further comprising a surface, and the method comprises determining a three-dimensional arrangement of the surface and another entity depicted in the image based on a characteristic of the surface.

11. The method of claim 10, comprising associating a surface affordance with the surface based on the characteristic of the surface and the three-dimensional arrangement of the surface and a person depicted in the image.

12. A non-transitory computer readable medium for storing computer instructions that, when executed by one or more processors causes the one or more processors to perform a method for inferring an area of interest in a two-dimensional image depicting at least one person, the method comprising, algorithmically:
locating the at least one person in the image;
determining, from the image, a spatial configuration of at least a portion of the at least one person located in the image;
estimating a three-dimensional position of the person from the determined spatial configuration;
analyzing the three-dimensional position of the person using a proxemics analysis;
determining a type of human interaction likely depicted in the image based on the proxemics analysis; and
inferring an area of interest in the image based on the determined type of human interaction, the area of interest at least partially spaced from the at least one person, and the area of interest having a size that is greater than zero and less than the size of the entire image.

13. A computing system comprising one or more of an image/video tagger, an information retrieval system, and an intelligent assistant and one or more processors to perform a method for inferring an area of interest in a two-dimensional image depicting at least one person, the method comprising, algorithmically:
locating the at least one person in the image;
determining, from the image, a spatial configuration of at least a portion of the at least one person located in the image;
estimating a three-dimensional position of the person from the determined spatial configuration;
analyzing the three-dimensional position of the person using a proxemics analysis;
determining a type of human interaction likely depicted in the image based on the proxemics analysis; and
inferring an area of interest in the image based on the determined type of human interaction, the area of interest at least partially spaced from the at least one person, and the area of interest having a size that is greater than zero and less than the size of the entire image.

14. A method for inferring an area of interest in a recorded two-dimensional image using a characteristic of a gaze of a person depicted in the recorded two-dimensional image, the method comprising, with a computing system, algorithmically:
detecting the person in the recorded two-dimensional image;
estimating a three-dimensional spatial configuration of at least a portion of the person in the image;
inferring a characteristic of the person's gaze in the image based on the estimated spatial configuration;
determining a proxemics class associated with the recorded two-dimensional image based on the determined three-dimensional spatial configuration; and
inferring an area of interest in the image based on at least one of the inferred characteristic of the person's gaze or the proxemics class.

15. The method of claim 14, wherein the estimated spatial configuration comprises an estimated head pose of the detected person and the method comprises inferring a characteristic of the person's gaze in the image based on the estimated head pose.

16. The method of claim 14, comprising classifying the recorded two-dimensional image as depicting a type of human interaction based on the inferred characteristic of the person's gaze.

17. The method of claim 16, wherein the recorded image comprises a plurality of images and the method comprises tracking the person's gaze by repeating the detecting, estimating, and inferring for the plurality of images over a time period, and reclassifying the recorded image as depicting a different type of human interaction based on the tracking of the person's gaze over the time period.

18. The method of claim 14, comprising inferring a direction of the person's gaze, and inferring an area of interest in the recorded two-dimensional image based on the direction of the person's gaze, wherein the area of interest at least partially spaced from the person, and the area of interest has a size that is greater than zero and less than the size of the entire recorded two-dimensional image.

19. The method of claim 18, wherein the inferring an area of interest comprises inferring a three-dimensional area of interest from the recorded two-dimensional image.

20. A non-transitory computer readable medium for storing computer instructions that, when executed by one or more processors, causes the one or more processors to perform a method for inferring an area of interest in a recorded two-dimensional image using a characteristic of a gaze of a person depicted in the recorded two-dimensional image, the method comprising, algorithmically:
detecting the person in the recorded two-dimensional image;
estimating a three-dimensional spatial configuration of at least a portion of the person in the image;
inferring a characteristic of the person's gaze in the image based on the estimated spatial configuration;
determining a proxemics class associated with the recorded two-dimensional image based on the determined three-dimensional spatial configuration; and
inferring an area of interest in the image based on at least one of the inferred characteristic of the person's gaze or the proxemics class.

21. A computing system comprising one or more of an image/video tagger, an information retrieval system, and an intelligent assistant and one or more processors to perform a method for inferring an area of interest in a recorded two-dimensional image using a characteristic of a gaze of a person depicted in the recorded two-dimensional image, the method comprising, algorithmically:
detecting the person in the recorded two-dimensional image;
estimating a three-dimensional spatial configuration of at least a portion of the person in the image;
inferring a characteristic of the person's gaze in the image based on the estimated spatial configuration;
determining a proxemics class associated with the recorded two-dimensional image based on the determined three-dimensional spatial configuration; and
inferring an area of interest in the image based on at least one of the inferred characteristic of the person's gaze or the proxemics class.

* * * * *